(12) United States Patent
Kawamura

(10) Patent No.: US 11,852,052 B2
(45) Date of Patent: Dec. 26, 2023

(54) HYDRAULIC OIL CONTROL VALVE AND VALVE TIMING ADJUSTMENT DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/483,540

(22) Filed: Sep. 23, 2021

(65) Prior Publication Data

US 2022/0010697 A1   Jan. 13, 2022

Related U.S. Application Data

(63) Continuation of application No. PCT/JP2020/012720, filed on Mar. 23, 2020.

(30) Foreign Application Priority Data

Mar. 25, 2019   (JP) .................................. 2019-055917

(51) Int. Cl.
   *F01L 1/344*      (2006.01)
   *F16K 11/07*      (2006.01)

(52) U.S. Cl.
   CPC ........ *F01L 1/3442* (2013.01); *F16K 11/0704* (2013.01); *F01L 2001/3443* (2013.01)

(58) Field of Classification Search
   CPC . F01L 1/3442; F01L 1/022; F01L 1/46; F01L 1/053; F01L 2001/3443; F01L 2001/34456; F01L 2001/34479; F01L 2001/34469; F01L 2301/00; F16K 11/0704; F16K 11/07; F16K 11/0716; F16K 27/041; Y10T 137/794; Y10T 137/8122; Y10T 137/86622
   See application file for complete search history.

(56) References Cited

U.S. PATENT DOCUMENTS 9,611,763 B2 *   4/2017   Fritsch ................... F16K 27/02
2013/0312678 A1   11/2013   Koehler
(Continued)

FOREIGN PATENT DOCUMENTS

| CN | 105019961 | 11/2015 |
|---|---|---|
| DE | 10 2012 200 682 | 7/2013 |

(Continued)

OTHER PUBLICATIONS

WO-2015141245-A1, English Language Machine Translation (Year: 2015).*

(Continued)

*Primary Examiner* — Wesley G Harris
(74) *Attorney, Agent, or Firm* — Nixon & Vanderhye P.C.

(57) ABSTRACT

A hydraulic oil control valve is coaxially disposed with a rotational axis of a valve timing adjustment device. The hydraulic oil control valve includes a sleeve, a spool, a movement restricting portion, a fixing member. The sleeve includes an inner sleeve and an outer sleeve. The fixing member is fixed to an end portion of the outer sleeve facing the actuator. The fixing member is configured to restrict the inner sleeve from moving in a circumferential direction relative to the outer sleeve and to restrict the inner sleeve and the spool from coming off from the outer sleeve toward the actuator in the axial direction.

9 Claims, 11 Drawing Sheets

(56) References Cited

U.S. PATENT DOCUMENTS

| | | |
|---|---|---|
| 2016/0245129 A1 | 8/2016 | Fritsch et al. |
| 2017/0022854 A1 | 1/2017 | Takada |
| 2019/0323388 A1 | 10/2019 | Mitsutani |
| 2019/0323392 A1 | 10/2019 | Mitsutani |
| 2019/0368387 A1 | 12/2019 | Mitsutani |

FOREIGN PATENT DOCUMENTS

| | | | | |
|---|---|---|---|---|
| DE | 10 2016 214 403 | | 6/2017 | |
| JP | 2018178972 A | * | 11/2018 | ............ F01L 1/344 |
| JP | 2020-159201 | | 10/2020 | |
| JP | 2020-159203 | | 10/2020 | |
| JP | 2020-159204 | | 10/2020 | |
| WO | WO-2015141245 A1 | * | 9/2015 | ............ F01L 1/047 |
| WO | 2020/196403 | | 10/2020 | |
| WO | 2020/196418 | | 10/2020 | |
| WO | 2020/196454 | | 10/2020 | |
| WO | 2020/196456 | | 10/2020 | |
| WO | 2020/196457 | | 10/2020 | |

OTHER PUBLICATIONS

U.S. Appl. No. 17/483,239, to Kawamura, entitled "Hydraulic Oil Control Valve and Valve Timing Adjustment Device", filed Sep. 23, 2021 (41 pages).

U.S. Appl. No. 17/483,371, to Kawamura, entitled "Hydraulic Oil Control Valve and Valve Timing Adjustment Device", filed Sep. 23, 2021 (33 pages).

U.S. Appl. No. 17/483,437, to Kawamura, entitled "Hydraulic Oil Control Valve and Valve Timing Adjustment Device", filed Sep. 23, 2021 (47 Pages).

U.S. Appl. No. 17/483,499, to Kawamura, entitled "Hydraulic Oil Control Valve and Valve Timing Adjustment Device", filed Sep. 23, 2021 (42 pages).

U.S. Appl. No. 17/483,605, to Kawamura, entitled "Hydraulic Oil Control Valve and Valve Timing Adjustment Device", filed Sep. 23, 2021 (34 pages).

* cited by examiner

HYDRAULIC OIL CONTROL VALVE AND VALVE TIMING ADJUSTMENT DEVICE

CROSS REFERENCE TO RELATED APPLICATION

The present application is a continuation application of International Patent Application No. PCT/JP2020/012720 filed on Mar. 23, 2020, which designated the U.S. and claims the benefit of priority from Japanese Patent Application No. 2019-055917 filed on Mar. 25, 2019. The entire disclosures of all of the above applications are incorporated herein by reference.

TECHNICAL FIELD

The present disclosure relates to a hydraulic oil control valve used for a valve timing adjustment device.

BACKGROUND

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor.

SUMMARY

A hydraulic oil control valve is configured to adjust valve timing of a valve and fixed to an end portion of one shaft that is a drive shaft or a driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve, a spool, a movement restricting portion, and a fixing member. The spool has an end portion in contact with an actuator and is slidably moved by the actuator in an axial direction within the sleeve. The sleeve includes an inner sleeve disposed radially outside of the spool and an outer sleeve defining an axial hole extending in the axial direction. The inner sleeve is inserted into at least a portion of the axial hole in the axial direction. The movement restricting portion is configured to restrict the inner sleeve from moving away from the actuator in the axial direction. The fixing member is fixed to an end portion of the outer sleeve facing the actuator. The fixing member is configured to restrict the inner sleeve from moving in a circumferential direction relative to the outer sleeve and to restrict the inner sleeve and the spool from coming off from the outer sleeve in the axial direction toward the actuator.

DESCRIPTION OF EMBODIMENTS

Figure 1:
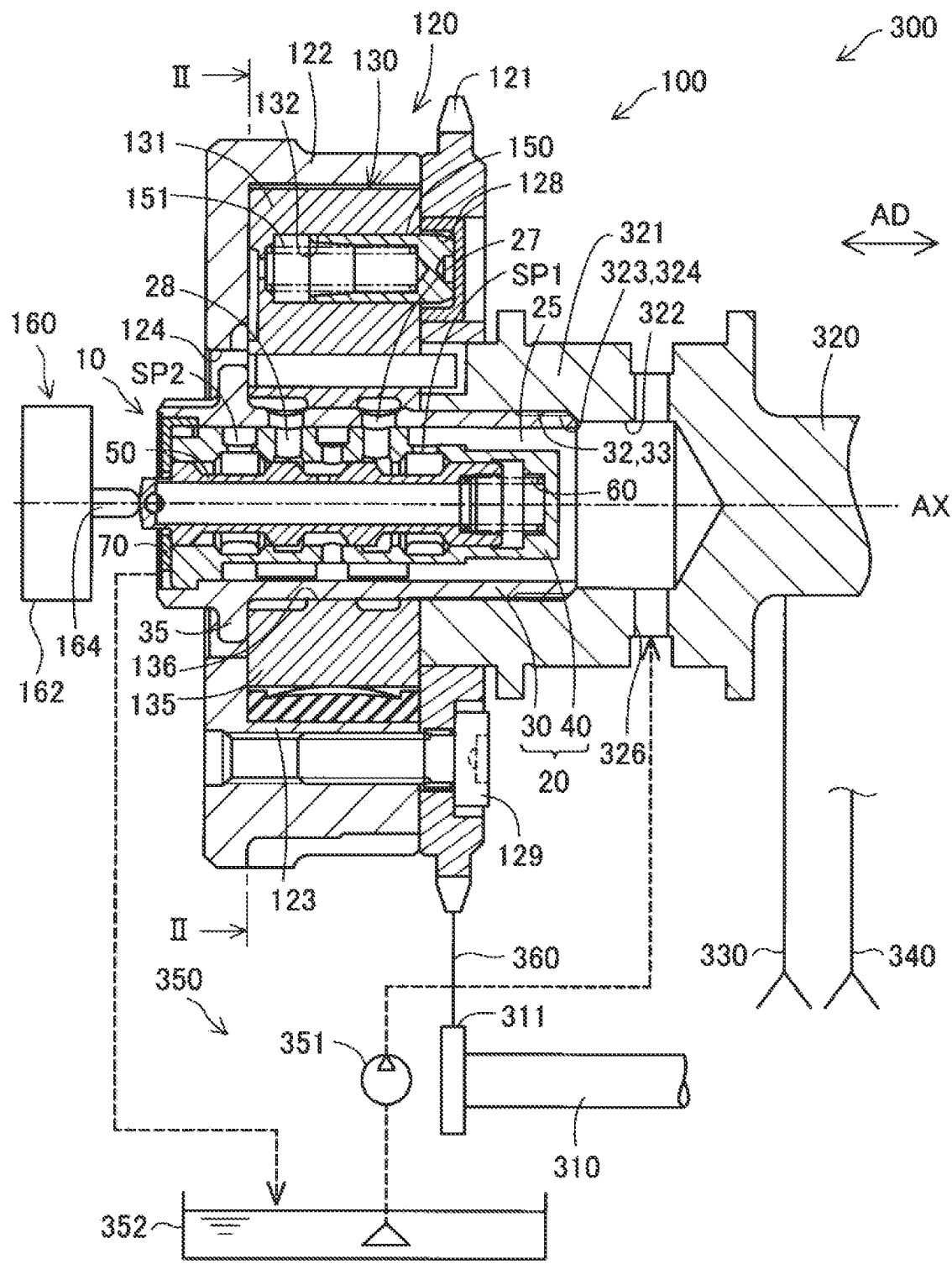
FIG. 1 is a cross-sectional view showing a schematic configuration of a valve timing adjustment device including a hydraulic oil control valve of a first embodiment.

To begin with, examples of relevant techniques will be described.

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. For example, a hydraulic oil control valve has a double-structure tubular sleeve including an outer sleeve and an inner sleeve. The outer sleeve is fastened to an end portion of a camshaft and a spool is moved inside the inner sleeve, so that an oil channel is switched.

In the hydraulic oil control valve, a plate member is arranged at an end portion of the hydraulic oil control valve that faces an actuator to prevent the inner sleeve and the spool from coming off toward the actuator. The inner sleeve has a protrusion on an outer circumferential surface and the outer sleeve includes a recessed portion on an inner circumferential surface. The protrusion of the inner sleeve is fit into the recessed portion of the outer sleeve to restrict the inner sleeve from rotating relative to the outer sleeve. For another example, the outer sleeve has a protrusion that protrudes radially inward at an end of the outer sleeve facing the actuator to prevent the inner sleeve and the spool from coming off toward the actuator. The protrusion of the outer sleeve defines a hole extending in an axial direction. The inner sleeve has a protrusion. The protrusion of the inner sleeve is fit into the hole of the protrusion of the outer sleeve to restrict the inner sleeve from rotating relative to the outer sleeve.

In the hydraulic oil control valve, it is not easy to form the recessed portion on the inner circumferential surface of the bottomed tubular outer sleeve and a manufacturing cost of the outer sleeve may increase to define the recessed portion. In the hydraulic oil control valve as another example, it is necessary to form the protrusion at the end of the outer sleeve and define the hole at the protrusion. Thus, it is difficult to form the outer sleeve and a manufacturing cost of the outer sleeve may increase. Therefore, there is a demand for a technique capable of suppressing an increase in cost required for preventing the inner sleeve and the spool from coming off toward the actuator and preventing the inner sleeve from rotating relative to the outer sleeve.

The present disclosure can be realized as the following embodiments.

According to one embodiment of the present disclosure, a hydraulic oil control valve is provided. This hydraulic oil control valve is configured to adjust valve timing of a valve and fixed to the end of one shaft that is the drive shaft or the driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve, a spool, a movement restricting portion, and a fixing member. The spool has an end portion in contact with an actuator and is slidably moved by the actuator in an axial direction within the sleeve. The sleeve includes an inner sleeve disposed radially outside of the spool and an outer sleeve defining an axial hole extending in the axial direction. The inner sleeve is inserted into at least a portion of the axial hole in the axial direction. The movement restricting portion is configured to restrict the inner sleeve from moving away from the actuator in the axial direction. The fixing member is fixed to an end portion of the outer sleeve facing the actuator. The fixing member is configured to restrict the inner sleeve from moving in a circumferential direction relative to the outer sleeve and to restrict the inner sleeve and the spool from coming off from the outer sleeve in the axial direction toward the actuator.

According to the hydraulic oil control valve of the present disclosure, the fixing member is fixed to the end portion of the outer sleeve facing the actuator. Further, the fixing member is configured to restrict the inner sleeve from rotating in the circumferential direction relative to the outer sleeve and to restrict the inner sleeve and the spool from coming off from the outer sleeve in the axial direction toward the actuator. Thus, an increase in cost for restricting the inner sleeve and the spool from coming off toward the actuator and for restricting the inner sleeve from rotating relative to the outer sleeve can be suppressed.

The present disclosure can be realized as the following embodiments. For example, it can be realized in a method for manufacturing a hydraulic oil control valve, a valve timing adjustment device provided with a hydraulic oil control valve, a method for manufacturing the valve timing adjustment device, and the like.

A. First Embodiment

A-1. Device Configuration:

A valve timing adjustment device 100 shown in FIG. 1 is used for an internal combustion engine 300 of a vehicle (not shown) and configured to adjust valve timing of a valve that is opened or closed by a camshaft 320 to which a driving force is transmitted from a crankshaft 310. The valve timing adjustment device 100 is provided in a power transmission path from the crankshaft 310 to the camshaft 320. More specifically, the valve timing adjustment device 100 is fixed to an end portion 321 of the camshaft 320 in a direction along a rotational axis AX of the camshaft 320 (hereinafter, referred to as "an axial direction AD"). The valve timing adjustment device 100 has a rotational axis AX that is coaxial with the rotational axis AX of the camshaft 320. The valve timing adjustment device 100 of the present embodiment is configured to adjust valve timing of an intake valve 330 among the intake valve 330 and an exhaust valve 340.

The end portion 321 of the camshaft 320 defines a shaft hole portion 322 and a supply inlet 326. The shaft hole portion 322 extends in the axial direction AD. The shaft hole portion 322 has a shaft fixing portion 323 on an inner circumferential surface of the shaft hole portion 322 to fix a hydraulic oil control valve which will be described later. The shaft fixing portion 323 has a female thread portion 324. The female thread portion 324 is screwed with a male thread portion 33 formed in a fixing portion 32 of the hydraulic oil control valve 10. The supply inlet 326 extends in a radial direction and passes through the camshaft 320 between an outer circumferential surface of the camshaft 320 and the shaft hole portion 322. Hydraulic oil is supplied to the supply inlet 326 from a hydraulic oil supply source 350. The hydraulic oil supply source 350 includes an oil pump 351 and an oil pan 352. The oil pump 351 pumps the hydraulic oil stored in the oil pan 352.

Figure 2:
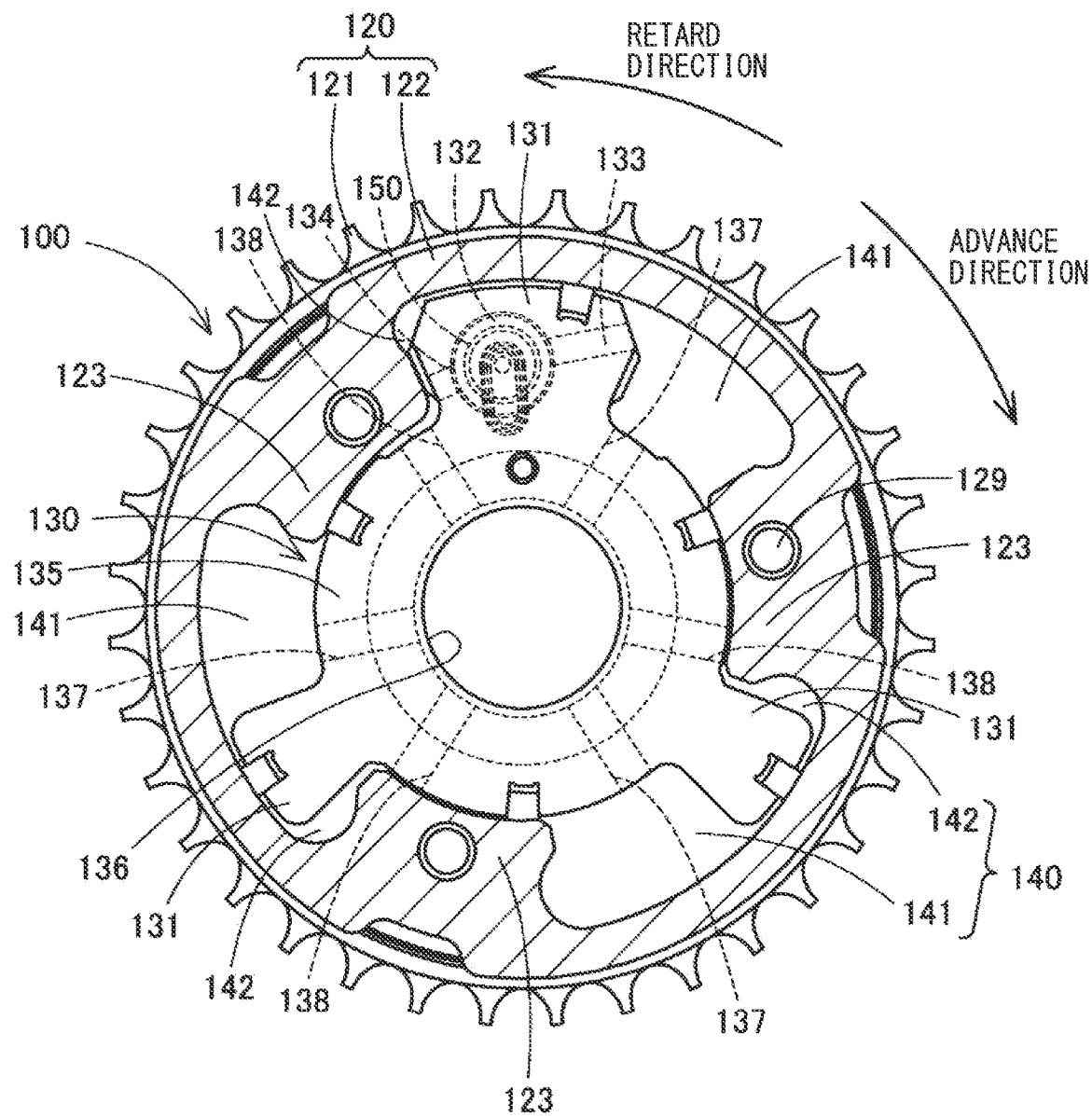
FIG. 2 is a cross-sectional view taken along a line II-II in FIG. 1.

As shown in FIGS. 1 and 2, the valve timing adjustment device 100 includes a housing 120, a vane rotor 130, and the hydraulic oil control valve 10. In FIG. 2, illustrations of the hydraulic oil control valve 10 are omitted.

As shown in FIG. 1, the housing 120 includes a sprocket 121 and a case 122. The sprocket 121 is fit to the end portion 321 of the camshaft 320 and is rotatably supported. The sprocket 121 defines a fitting recessed portion 128 at a position corresponding to a lock pin 150 which will be described later. An annular timing chain 360 is disposed around the sprocket 121 and a sprocket 311 of the crankshaft 310. The sprocket 121 is fixed to the case 122 with multiple bolts 129. Thus, the housing 120 rotates together with the crankshaft 310. The case 122 has a bottomed tubular shape and an opening end of the case 122 is closed by the sprocket 121. As shown in FIG. 2, the case 122 includes multiple partition walls 123 that protrude radially inward and are arranged in a circumferential direction. Spaces defined between adjacent ones of the partition walls 123 in the circumferential direction serve as hydraulic chambers 140. As shown in FIG. 1, the case 122 defines an opening 124 at a center of a bottom portion of the case 122.

The vane rotor 130 is housed inside the housing 120 and configured to rotate in a retard direction or in an advance direction relative to the housing 120 in accordance with a hydraulic pressure of the hydraulic oil supplied from the hydraulic oil control valve 10 which will be described later. Therefore, the vane rotor 130 serves as a phase shifting portion configured to shift a phase of a driven shaft relative to a drive shaft. The vane rotor 130 includes multiple vanes 131 and a boss 135.

As shown in FIG. 2, the multiple vanes 131 protrude radially outward from the boss 135 that is located at a center of the vane rotor 130 and are arranged adjacent to each other in the circumferential direction. The vanes 131 are housed respectively in the hydraulic chambers 140 and divide the hydraulic chambers 140 in the circumferential direction into retard chambers 141 and advance chambers 142. The retard chamber 141 is located on one side of the vane 131 in the circumferential direction. The advance chamber 142 is located on the other side of the vane 131 in the circumferential direction. One of the multiple vanes 131 defines a housing hole 132 in the axial direction. The housing hole 132 is in communication with the retard chamber 141 through a retard chamber pin control oil channel 133 defined in the vane 131 and in communication with the advance chamber 142 through an advance chamber pin control oil channel 134. The lock pin 150 is housed in the housing hole 132 such that the lock pin 150 can reciprocate in the axial direction AD in the housing hole 132. The lock pin 150 is configured to restrict the vane rotor 130 from rotating relative to the housing 120 and from coming into contact with the housing 120 in the circumferential direction when the hydraulic pressure is insufficient. The lock pin 150 is biased in the axial direction AD toward the fitting recessed portion 128 formed in the sprocket 121 by a spring 151.

The boss 135 has a tubular shape and is fixed to the end portion 321 of the camshaft 320. Therefore, the vane rotor 130 having the boss 135 is fixed to the end portion 321 of the camshaft 320 and rotates together with the camshaft 320 in an integral manner. The boss 135 defines a through hole 136 passing through the boss 135 in the axial direction at a center of the boss 135. The hydraulic oil control valve 10 is arranged in the through hole 136. The boss 135 defines multiple retard channels 137 and multiple advance channels 138. The retard channels 137 and the advance channels 138 pass through the boss 135 in the radial direction. The retard channels 137 and the advance channels 138 are arranged in the axial direction AD. The retard channels 137 fluidly connect between the retard chambers 141 and retard ports 27 of the hydraulic oil control valve 10 which will be described later. The advance channels 138 fluidly connect between the advance chambers 142 and advance ports 28 of the hydraulic oil control valve 10 which will be described later. In the through hole 136, gaps between the retard channels 137 and the advance channels 138 are sealed by an outer sleeve 30 of the hydraulic oil control valve 10 which will be described later.

In the present embodiment, the housing 120 and the vane rotor 130 are made of an aluminum alloy, but a material of the housing 120 and the vane rotor 130 is not limited to the aluminum alloy and may be any metal material such as iron or stainless steel, a resin material, or the like.

As shown in FIG. 1, the hydraulic oil control valve 10 is used for the valve timing adjustment device 100 and coaxially arranged with the rotational axis AX of the valve timing adjustment device 100. The hydraulic oil control valve 10 is configured to control a flow of the hydraulic oil supplied from the hydraulic oil supply source 350. The operation of the hydraulic oil control valve 10 is controlled by an ECU (not shown) that controls an overall operation of the internal combustion engine 300. The hydraulic oil control valve 10 is driven by a solenoid 160 arranged on a side of the hydraulic oil control valve 10 opposite to the camshaft 320 in the axial direction AD. The solenoid 160 has an electromagnetic portion 162 and a shaft 164. The solenoid 160 moves the shaft 164 in the axial direction AD when the electromagnetic portion 162 is energized by instructions from the ECU. Thereby, the shaft 164 presses a spool 50 of the hydraulic oil control valve 10, which will be described later, toward the camshaft 320 against a biasing force of the spring 60. As will be described later, the spool 50 slides in the axial direction AD by being pressed, so that oil channels can be switched between oil channels in communication with the retard chambers 141 and oil channels in communication with the advance chambers 142.

Figure 3:
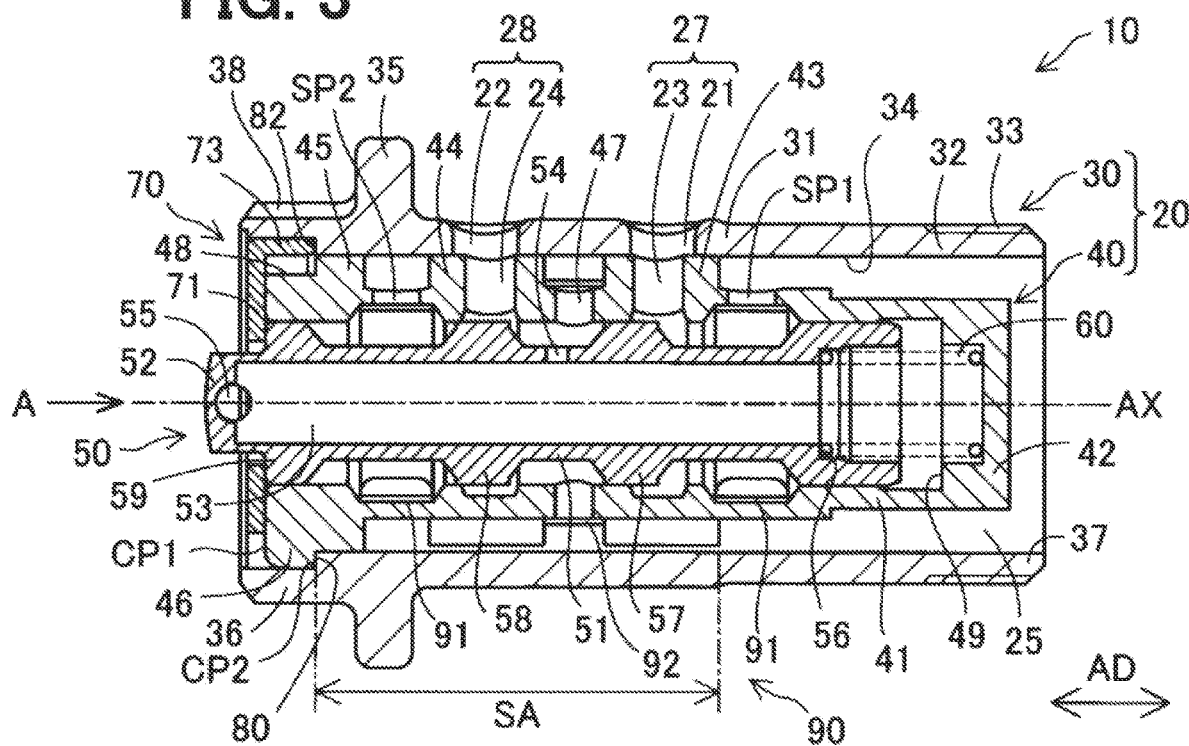
FIG. 3 is a cross-sectional view showing a detailed configuration of the hydraulic oil control valve.
Figure 4:
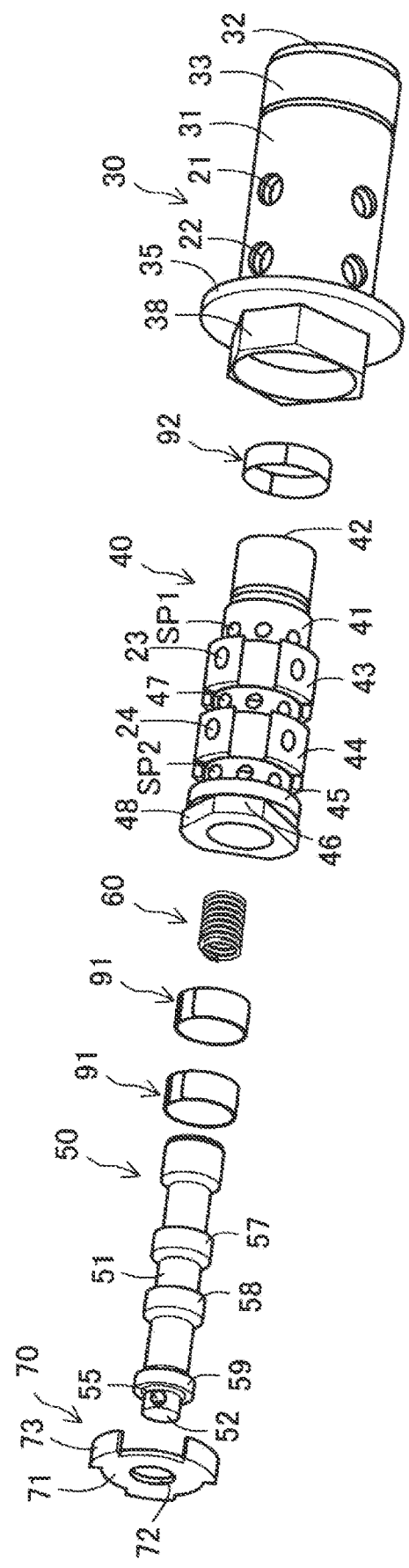
FIG. 4 is an exploded perspective view showing the detailed configuration of the hydraulic oil control valve.

As shown in FIGS. 3 and 4, the hydraulic oil control valve 10 includes a sleeve 20, the spool 50, the spring 60, a fixing member 70, and a check valve 90. FIG. 3 is a cross-sectional view taken along the rotational axis AX.

The sleeve 20 includes the outer sleeve 30 and an inner sleeve 40. Each of the outer sleeve 30 and the inner sleeve 40 substantially has a tubular appearance. The sleeve 20 has a schematic configuration in which the inner sleeve 40 is inserted into an axial hole 34 defined in the outer sleeve 30.

The outer sleeve 30 forms an outer contour of the hydraulic oil control valve 10 and is disposed radially outside of the inner sleeve 40. The outer sleeve 30 has a main body 31, a protrusion 35, a fixing portion 32, a large diameter portion 36, a movement restricting portion 80, a positioning portion 82, and a tool engaging portion 38. The main body 31 and the fixing portion 32 define the axial hole 34 extending in the axial direction AD. The axial hole 34 passes through the outer sleeve 30 in the axial direction AD.

The main body 31 has a tubular appearance and is arranged in the through hole 136 of the vane rotor 130 as shown in FIG. 1. As shown in FIG. 4, the main body 31 defines multiple outer retard ports 21 and multiple outer advance ports 22. The multiple outer retard ports 21 are arranged adjacent to each other in the circumferential direction and pass through the main body 31 between an outer circumferential surface of the main body 31 and the axial hole 34. The multiple outer advance ports 22 are defined between the outer retard ports 21 and the solenoid 160 in the axial direction AD. The multiple outer advance ports 22 are arranged adjacent to each other in the circumferential direction and pass through the main body 31 between the outer circumferential surface of the main body 31 and the axial hole 34.

The protrusion 35 protrudes radially outward from the main body 31. The protrusion 35 holds the vane rotor 130 shown in FIG. 1 between the protrusion 35 and the end portion 321 of the camshaft 320 in the axial direction AD. Therefore, the protrusion 35 is in contact with the vane rotor 130 in the axial direction AD to generate an axial force.

The fixing portion 32 has a tubular appearance and is connected to the main body 31 in the axial direction AD. The fixing portion 32 has a diameter substantially the same as that of the main body 31 and is inserted into the shaft fixing portion 323 of the camshaft 320 as shown in FIG. 1. The fixing portion 32 has the male thread portion 33. The male thread portion 33 is screwed with the female thread portion 324 of the shaft fixing portion 323. The male thread portion 33 and the female thread portion 324 are fastened to each other, so that an axial force in the axial direction AD toward the camshaft 320 is applied to the outer sleeve 30 and the outer sleeve 30 is fixed to the end portion 321 of the camshaft 320. With the axial force, it is possible to prevent the hydraulic oil control valve 10 from being displaced from the end portion 321 of the camshaft 320 due to an eccentric force generated when the camshaft 320 pushes the intake valve 330. Thus, it is possible to restrict the hydraulic oil from leaking.

As shown in FIG. 3, the large diameter portion 36 is formed in an end portion of the main body 31 closer to the solenoid 160. The large diameter portion 36 has an inner diameter that is larger than that of other portions of the main body 31. In the large diameter portion 36, a flange portion 46 of the inner sleeve 40, which will be described later, is arranged.

The movement restricting portion 80 is configured as a stepped portion in the radial direction on the inner circumferential surface of the outer sleeve 30, which is formed by the large diameter portion 36. The movement restricting portion 80 holds the flange portion 46 of the inner sleeve 40 between the movement restricting portion 80 and the fixing member 70 in the axial direction AD. As a result, the movement restricting portion 80 restricts the inner sleeve 40 from moving away from the electromagnetic portion 162 of the solenoid 160 in the axial direction AD. In other words, the movement restricting portion 80 is configured to restrict the inner sleeve 40 from moving in the axial direction AD toward a side of the inner sleeve 40 opposite to the solenoid 160. In the present embodiment, the movement restricting portion 80 is located between the protrusion 35 and the solenoid 160 in the axial direction AD.

The positioning portion 82 is configured as the stepped portion in the radial direction on the inner circumferential surface of the outer sleeve 30, which is defined by the large diameter portion 36. That is, a portion of the stepped portion in the circumferential direction serves as the movement restricting portion 80 and other portion of the stepped portion in the circumferential direction serves as the positioning portion 82. The positioning portion 82 is in contact with ends of fitting protrusions 73 of the fixing member 70, which will be described later, in the axial direction AD. The contact between the positioning portion 82 and the fixing member 70 determines a position of the fixing member 70 in the axial direction AD when the fixing member 70 is assembled to the outer sleeve 30.

The tool engaging portion 38 is formed between the protrusion 35 and the solenoid 160 in the axial direction AD. The tool engaging portion 38 is configured to be engaged with a tool such as a hexagon socket (not shown), and is used for fastening and fixing the hydraulic oil control valve 10 including the outer sleeve 30 to the end portion 321 of the camshaft 320.

Figure 5:
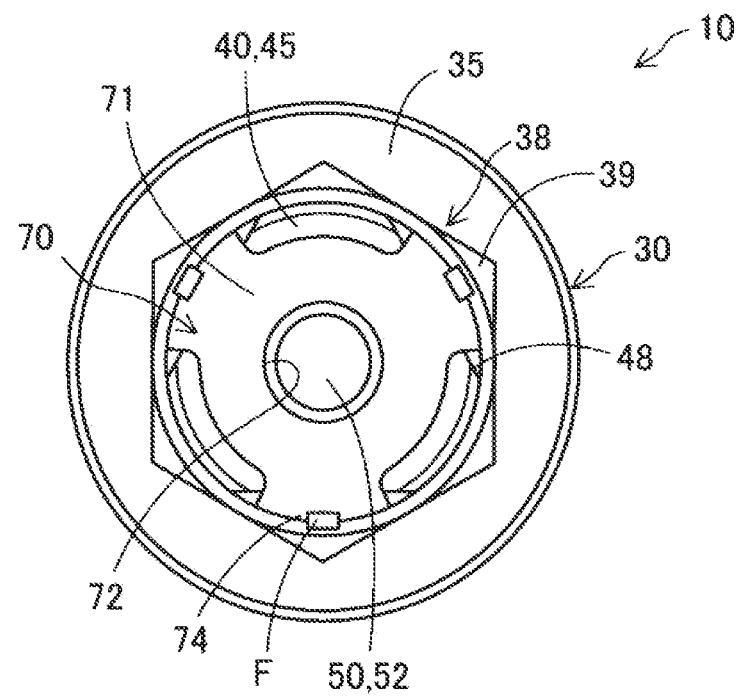
FIG. 5 is a diagram viewed in a direction of an arrow A in FIG. 3.

As shown in FIG. 5, the tool engaging portion 38 has a hexagonal shape in a cross-section perpendicular to the rotation axis AX. Therefore, the tool engaging portion 38 has six peaks 39 each having a thick thickness in the radial direction.

As shown in FIG. 3, the outer sleeve 30 of the present embodiment further has a non-arranged portion 37 inside which the inner sleeve 40 is not arranged in the radial direction. The non-arranged portion 37 is an end portion of the fixing portion 32 closer to the camshaft 320. In the present embodiment, the non-arranged portion 37 has an inner diameter larger than that of the inner sleeve 40. Therefore, the minimum value of the inner diameter of the outer sleeve 30 is larger than the maximum value of the inner diameter of the inner sleeve 40.

Figure 6:
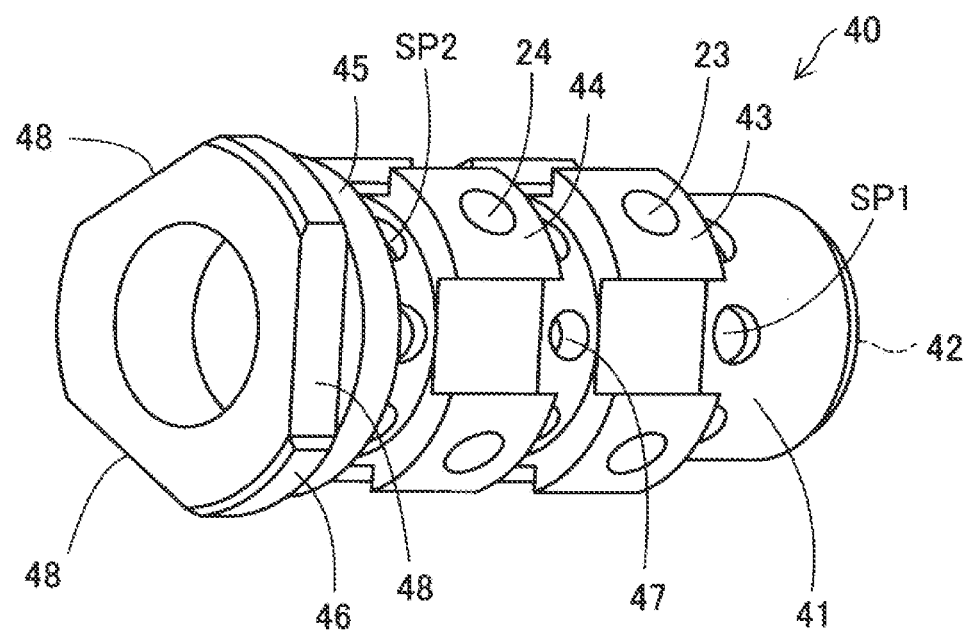
FIG. 6 is a perspective view showing a schematic configuration of an inner sleeve.

As shown in FIGS. 3 and 6, the inner sleeve 40 includes a tubular portion 41, a bottom portion 42, multiple retard protruding walls 43, multiple advance protruding walls 44, a sealing wall 45, the flange portion 46, and a stopper 49.

The tubular portion 41 substantially has a tubular appearance and is located radially inside of the main body 31 and the fixing portion 32 of the outer sleeve 30. The tubular portion 41 defines retard supply ports SP1, advance supply ports SP2, and recycling ports 47. The retard supply ports SP1 are defined between the retard protruding walls 43 and the bottom portion 42 in the axial direction AD and pass through the tubular portion 41 between an outer circumferential surface and an inner circumferential surface of the tubular portion 41. In the present embodiment, the multiple retard supply ports SP1 are arranged in the circumferential direction on a half circumference of the tubular portion 41. However, the multiple retard supply ports SP1 may be arranged on an all circumference of the tubular portion 41 or the tubular portion 41 may have a single retard supply port SP1. The advance supply ports SP2 are defined between the advance protruding walls 44 and the solenoid 160 in the axial direction AD and pass through the tubular portion 41 between the outer circumferential surface and the inner circumferential surface of the tubular portion 41. In the present embodiment, the multiple advance supply ports SP2 are arranged in the circumferential direction on a half circumference of the tubular portion 41. However, the multiple advance supply ports SP1 may be arranged on an all circumference of the tubular portion 41 or the tubular portion 41 may have a single advance supply port SP2. The retard supply ports SP1 and the advance supply ports SP2 are in communication with the shaft hole portion 322 of the camshaft 320 shown in FIG. 1. As shown in FIGS. 3 and 6, the recycling ports 47 are defined between the retard protruding walls 43 and the advance protruding walls 44 in the axial direction AD and pass through the tubular portion 41 between the outer circumferential surface and the inner circumferential surface of the tubular portion 41. As shown in FIG. 6, the recycling ports 47 are in communication with the retard supply ports SP1 and the advance supply ports SP2. Specifically, the recycling ports 47 are in communication with the retard supply ports SP1 through spaces that are defined between the inner circumferential surface of the main body 31 of the outer sleeve 30 and the outer circumferential surface of the tubular portion 41 of the inner sleeve 40 and that are defined between adjacent ones of the retard protruding walls 43 in the circumferential direction. The recycling ports 47 are in communication with the advance supply ports SP2 through spaces that are defined between the inner circumferential surface of the main body 31 of the outer sleeve 30 and the outer circumferential surface of the tubular portion 41 of the inner sleeve 40 and that are defined between adjacent ones of the advance protruding walls 44 in the circumferential direction. Therefore, the recycling ports 47 serve as a recycling mechanism for returning the hydraulic oil discharged from the retard chambers 141 or the advance chambers 142 to the supply source. In the present embodiment, multiple recycling ports 47 are formed adjacent to each other in the circumferential direction, but the tubular portion 41 may have a single recycling port 47. An operation of the valve timing adjustment device 100 including a switching of the oil channels by sliding the spool 50 will be described later.

As shown in FIG. 3, the bottom portion 42 is integrally formed with the tubular portion 41 and closes an end portion of the tubular portion 41 away from the solenoid 160 in the axial direction AD (in other words, an end portion of the tubular portion 41 closer to the camshaft 320). One end of the spring 60 is in contact with the bottom portion 42.

As shown in FIG. 6, the multiple retard protruding walls 43 protrude radially outward from the tubular portion 41 and are arranged adjacent to each other in the circumferential direction. The retard protruding walls 43 define spaces therebetween in the circumferential direction. The spaces are in communication with the shaft hole portion 322 of the camshaft 320 shown in FIG. 1 and the hydraulic oil supplied from the hydraulic oil supply source 350 flows through the spaces. As shown in FIG. 6, each of the retard protruding walls 43 defines an inner retard port 23. The inner retard port 23 passes through the retard protruding wall 43 between an outer circumferential surface and an inner circumferential surface of the retard protruding wall 43. As shown in FIG. 3, the inner retard port 23 is in communication with the outer retard port 21 defined in the outer sleeve 30. The inner retard port 23 has an axis that is displaced from an axis of the outer retard port 21 in the axial direction AD.

As shown in FIG. 6, the multiple advance protruding walls 44 are disposed between the retard protruding walls 43 and the solenoid 160 in the axial direction AD. The multiple advance protruding walls 44 protrude radially outward from the tubular portion 41 and are arranged adjacent to each other in the circumferential direction. The advance protruding walls 44 define spaces therebetween in the circumferential direction. The spaces are in communication with the shaft hole portion 322 shown in FIG. 1 and the hydraulic oil supplied from the hydraulic oil supply source 350 flows through the spaces. As shown in FIG. 6, each of the advance protruding walls 44 defines an inner advance port 24. The inner advance port 24 passes through the advance protruding wall 44 between an outer circumferential surface and an inner circumferential surface of the advance protruding wall 44. As shown in FIG. 3, the inner advance port 24 is in communication with the outer advance port 22 defined in the outer sleeve 30. The inner advance port 24 has an axis that is displaced from an axis of the outer advance port 22 in the axial direction AD.

The sealing wall 45 protrudes radially outward from an entire circumference of the tubular portion 41. The sealing wall 45 is disposed between the advance supply ports SP2 and the solenoid 160 in the axial direction AD. The sealing wall 45 seals a gap between the inner circumferential surface of the main body 31 of the outer sleeve 30 and the outer circumferential surface of the tubular portion 41 of the inner sleeve 40, thereby restricting the hydraulic oil flowing through a hydraulic oil supply passage 25, which will be described later, from leaking toward the solenoid 160. The sealing wall 45 has an outer diameter that is substantially same as that of the retard protruding walls 43 and that of the advance protruding walls 44.

The flange portion 46 protrudes radially outward from an entire circumference of the tubular portion 41 at an end portion of the inner sleeve 40 facing the solenoid 160. The flange portion 46 is located in the large diameter portion 36 of the outer sleeve 30. As shown in FIG. 6, the flange portion 46 includes multiple fitting portions 48. The multiple fitting portions 48 are arranged adjacent to each other in the circumferential direction at an outer edge of the flange portion 46. In the present embodiment, the fitting portions 48 are formed by cutting off an outer edge of the flange portion 46 straight. However, the fitting portions 48 may be formed by cutting off the outer edge into a curved shape. Fitting portions 48 are fit with the fitting protrusions 73 of the fixing member 70 which will be described later. In the present embodiment, an end surface of the flange portion 46 facing the solenoid 160 is a first contact portion CP1. The first contact portion CP1 is configured to be in contact with the fixing member 70. Further, an end surface of the flange portion 46 facing the camshaft 320 is a second contact portion CP2. The second contact portion CP2 is configured to be in contact with the movement restricting portion 80.

As shown in FIG. 3, the stopper 49 is formed at the end portion of the inner sleeve 40 closer to the camshaft 320 in the axial direction AD. The stopper 49 has an inner diameter smaller than that of other portion of the tubular portion 41 and the end portion of the spool 50 closer to the camshaft 320 can come into contact with the stopper 49. The stopper 49 defines a sliding limit position of the spool 50 in a direction away from the electromagnetic portion 162 of the solenoid 160.

The inner sleeve 40 and the axial hole 34 defined in the outer sleeve 30 define a space therebetween and the space serves as the hydraulic oil supply passage 25. The hydraulic oil supply passage 25 is in communication with the shaft hole portion 322 of the camshaft 320 shown in FIG. 1 and guides the hydraulic oil supplied from the hydraulic oil supply source 350 to the retard supply ports SP1 and the advance supply ports SP2. As shown in FIG. 3, the outer retard ports 21 and the inner retard ports 23 form retard ports 27 that are in communication with the retard chambers 141 through the retard oil channels 137 shown in FIG. 2. As shown in FIG. 3, the outer advance ports 22 and the inner advance ports 24 form advance ports 28 that are in communication with the advance chambers 142 through the advance channels 138 shown in FIG. 2.

As shown in FIG. 3, at least a part in the axial direction AD between the outer sleeve 30 and the inner sleeve 40 is sealed to restrict a leak of the hydraulic oil. More specifically, the retard protruding walls 43 seal between the retard ports 27 and the retard supply ports SP1 and between the retard ports 27 and the recycling ports 47. The advance protruding walls 44 seal between the advance ports 28 and the advance supply ports SP2 and between the advance ports 28 and the recycling ports 47. Further, the sealing wall 45 seals between the hydraulic oil supply passage 25 and an outside of the hydraulic oil control valve 10. That is, an area in the axial direction AD between the retard protruding walls 43 and the sealing wall 45 is set as a sealing area SA. Further, in the present embodiment, the main body 31 of the outer sleeve 30 has an inner diameter that is substantially constant in the sealing area SA.

The spool 50 is arranged radially inside of the inner sleeve 40. The spool 50 has an end portion in contact with the solenoid 160 and is driven and moved in the axial direction AD by the solenoid 160. The spool 50 has a spool tubular portion 51, a spool bottom portion 52, and a spring receiving portion 56. Further, the spool 50 defines a drain inlet 54, a drain outlet 55, and at least a portion of a drain passage 53.

Figure 8:
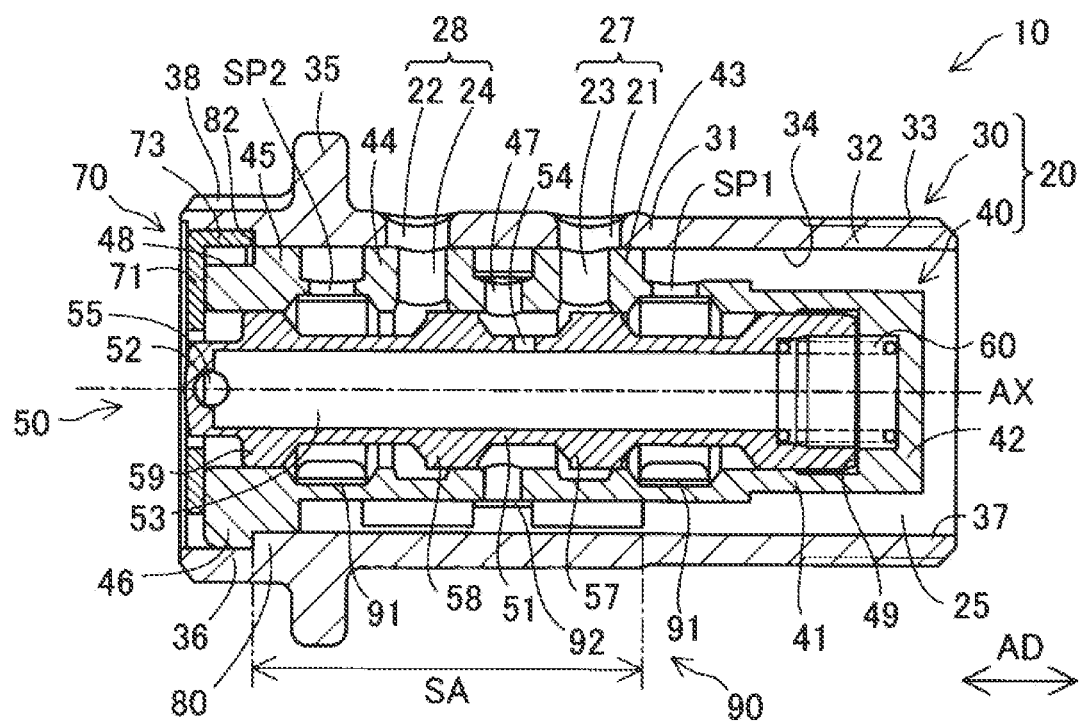
FIG. 8 is a cross-sectional view showing a state where a spool is in contact with a stopper.

As shown in FIGS. 3 and 4, the spool tubular portion 51 substantially has a tubular appearance. The spool tubular portion 51 has a retard sealing portion 57, an advance sealing portion 58, and a stopper 59 on an outer circumferential surface of the spool tubular portion 51. The retard sealing portion 57, the advance sealing portion 58, and the stopper 59 are arranged in this order from the end portion of the spool 50 closer to the camshaft 320 in the axial direction AD. Each of the retard sealing portion 57, the advance sealing portion 58, and the stopper 59 protrudes radially outward entirely in the circumferential direction. As shown in FIG. 3, the retard sealing portion 57 blocks a communication between the recycling ports 47 and the retard ports 27 when the spool 50 is located at the closest position to the electromagnetic portion 162 of the solenoid 160. As shown in FIG. 8, the retard sealing portion 57 blocks a communication between the retard supply ports SP1 and the retard ports 27 when the spool 50 is located at the farthest position from the electromagnetic portion 162. As shown in FIG. 3, the advance sealing portion 58 blocks a communication between the advance supply ports SP2 and the advance ports 28 when the spool 50 is located at the closest position to the electromagnetic portion 162. As shown in FIG. 8, the advance sealing portion 58 blocks a communication between the recycling ports 47 and the advance ports 28 when the spool 50 is located at the farthest position from the electromagnetic portion 162. The stopper 59 defines a sliding limit of the spool 50 toward the electromagnetic portion 162 of the solenoid 160 by coming into contact with the fixing member 70.

The spool bottom portion 52 is integrally formed with the spool tubular portion 51 and closes an end portion of the spool tubular portion 51 facing the solenoid 160. The spool bottom portion 52 can extend beyond the sleeve 20 toward the solenoid 160 in the axial direction AD. The spool bottom portion 52 serves as a proximal end portion of the spool 50.

A space surrounded by the spool tubular portion 51, the spool bottom portion 52, the tubular portion 41 of the inner sleeve 40, and the bottom portion 42 of the inner sleeve 40 serves as the drain passage 53. Therefore, at least a part of the drain passage 53 is formed inside the spool 50. The hydraulic oil discharged from the retard chambers 141 and the advance chambers 142 flows through the drain passage 53.

The drain inlet 54 is defined in the spool tubular portion 51 between the retard sealing portion 57 and the advance sealing portion 58 in the axial direction AD. The drain inlet 54 passes through the spool tubular portion 51 between the outer circumferential surface and the inner circumferential surface of the spool tubular portion 51. The drain inlet 54 guides the hydraulic oil discharged from the retard chambers 141 and the advance chambers 142 to the drain passage 53. Further, the drain inlet 54 is in communication with the supply ports SP1 and SP2 through the recycling ports 47.

The spool bottom portion 52, which is an end of the spool 50, defines the drain outlet 55. The drain outlet 55 opens radially outward. The hydraulic oil in the drain passage 53 is discharged from the hydraulic oil control valve 10 through the drain outlet 55. As shown in FIG. 1, the hydraulic oil discharged through the drain outlet 55 is collected in the oil pan 352.

As shown in FIG. 3, the spring receiving portion 56 is formed at an end portion of the spool tubular portion 51 closer to the camshaft 320 and has an inner diameter that is larger than other portion of the spool tubular portion 51. The other end of the spring 60 is in contact with the spring receiving portion 56.

In the present embodiment, each of the outer sleeve 30 and the spool 50 is made of iron and the inner sleeve 40 is made of aluminum. Materials of the outer sleeve 30, the spool 50, and the inner sleeve 40 are not limited to these materials, and may be any metal material, resin material, or the like.

The spring 60 is composed of a compression coil spring and has one end in contact with the bottom portion 42 of the inner sleeve 40 and the other end in contact with the spring receiving portion 56 of the spool 50. The spring 60 biases the spool 50 toward the solenoid 160 in the axial direction AD.

The fixing member 70 is fixed to the end portion of the outer sleeve 30 facing the solenoid 160. The fixing member 70 is configured to restrict the inner sleeve 40 from rotating in the circumferential direction relative to the outer sleeve 30 and to restrict the inner sleeve 40 and the spool 50 from coming off from the outer sleeve 30 toward the solenoid 160 in the axial direction AD. The fixing member 70 includes a flat plate portion 71 and the multiple fitting protrusions 73.

Figure 7:
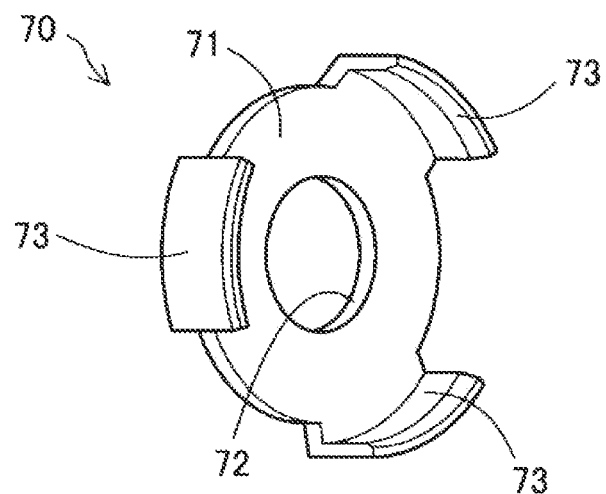
FIG. 7 is a perspective view showing a schematic configuration of a fixing member.

As shown in FIG. 7, the flat plate portion 71 has a flat plate shape extending in the radial direction. Extending direction of the flat plate portion 71 is not limited to the radial direction and may be a direction intersecting the axial direction AD. The flat plate portion 71 defines an opening 72 at a center of the flat plate portion 71. As shown in FIG. 3, the spool bottom portion 52, which is one end portion of the spool 50, is inserted into the opening 72.

As shown in FIG. 7, the multiple fitting protrusions 73 protrude from the flat plate portion 71 in the axial direction AD, and are arranged side by side in the circumferential direction. Protruding direction of the fitting protrusions 73 is not limited to the axial direction AD and may be any direction intersecting the radial direction. The fitting protrusions 73 fit to the fitting portions 48 of the inner sleeve 40 respectively.

As shown in FIG. 3, the spool 50 is inserted into the inner sleeve 40 and the fixing member 70 is assembled such that the fitting protrusions 73 fit to the fitting portions 48. After that, the fixing member 70 is deformed to be fixed to the outer sleeve 30. As shown in FIG. 5, an outer edge portion of the end surface of the fixing member 70 facing the solenoid 160 serves as deformed portions 74 that are deformed to be fixed to the outer sleeve 30. The deformed portions 74 are deformed to be fixed at positions corresponding to the peaks 39 of the tool engaging portion 38 of the outer sleeve 30 in the circumferential direction. As a result, deformed pieces F are formed at the positions of the deformed portion 74 corresponding to the peaks 39. In the present embodiment, the fixing member 70 is deformed and fixed at the positions corresponding to three of the six peaks 39 of the tool engaging portion 38 that are intermittently arranged in the circumferential direction. When the deformed portions 74 are fixed to the outer sleeve 30, end portions of the fitting protrusions 73 of the fixing member 70 closer to the camshaft 320 are in contact with the positioning portions 82 formed in the outer sleeve 30. Thereby, the position of the fixing member 70 in the axial direction AD is determined.

The fixing member 70 is fixed to the outer sleeve 30 while the fitting protrusions 73 fit to the fitting portions 48. Thus, the inner sleeve 40 is restricted from rotating in the circumferential direction relative to the outer sleeve 30. Further, the fixing member 70 is fixed to the outer sleeve 30, so that the inner sleeve 40 and the spool 50 are restricted from coming off from the outer sleeve in the axial direction AD toward the solenoid 160.

Figure 3A:
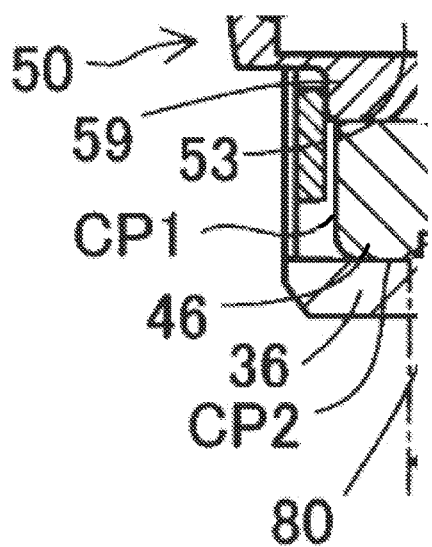
FIG. 3A is a modified excerpt of the cross-sectional view shown in FIG. 3 showing a portion of an alternative example configuration of the hydraulic oil control valve.

As shown in FIG. 3A, in a state where the fixing member 70 is deformed and fixed to the outer sleeve 30, at least one of a gap between the fixing member 70 and the first contact portion CP1 and a gap between the movement restricting portion 80 and the second contact portion CP2 is defined in the axial direction AD. In other words, in the state where the fixing member 70 is deformed and fixed to the outer sleeve 30, a dimension between an end surface of the flat plate portion 71 of the fixing member 70 facing the first contact portion CP1 and an end surface of the movement restricting portion 80 facing the second contact portion CP2 in the axial direction AD is slightly larger than a dimension between the first contact portion CP1 and the second contact portion CP2 of the inner sleeve 40 in the axial direction AD, i.e., a thickness of the flange portion 46.

The check valve 90 suppresses a backflow of the hydraulic oil. The check valve 90 includes two supply check valves 91 and a recycling check valve 92. As shown in FIG. 4, each of the supply check valves 91 and the recycling check valve 92 are formed by winding a band-shaped thin plate into an annular shape, so that each of the supply check valves 91 and the recycling check valve 92 can be elastically deformed in the radial direction. As shown in FIG. 3, each of the supply check valves 91 is arranged in contact with the inner circumferential surface of the tubular portion 41 at a position corresponding to the retard supply port SP1 or the advance supply port SP2. When each of the supply check valves 91 receives pressure of the hydraulic oil from an outside of the each of the supply check valves 91 in the radial direction, an overlapping area of the band-shaped thin plate increases and the each of the supply check valves 91 shrinks in the radial direction. The recycling check valve 92 is arranged in contact with the outer circumferential surface of the tubular portion 41 at a position corresponding to the recycling port 47. When the recycling check valve 92 receives the pressure of the hydraulic oil from an inside of the recycling check valve 92 in the radial direction, an overlapping area of the band-shaped thin plate decreases and expands in the radial direction.

In the present embodiment, the crankshaft 310 is a subordinate concept of the drive shaft in the present disclosure, the camshaft 320 is a subordinate concept of the driven shaft in the present disclosure, and the intake valve 330 is a subordinate concept of the valve in the present disclosure. Further, the solenoid 160 is a subordinate concept of the actuator in the present disclosure, and the vane rotor 130 is a subordinate concept of the phase shifting portion in the present disclosure.

A-2. Operation of Valve Timing Adjustment Device:

As shown in FIG. 1, the hydraulic oil supplied from the hydraulic oil supply source 350 to the supply inlet 326 flows into the hydraulic oil supply passage 25 through the shaft hole portion 322. When the solenoid 160 is not energized and the spool 50 is located at the closest position to the electromagnetic portion 162 of the solenoid 160 as shown in FIG. 3, the retard ports 27 are in communication with the retard supply ports SP1. As a result, the hydraulic oil in the hydraulic oil supply passage 25 is supplied into the retard chambers 141, the vane rotor 130 rotates in the retard direction relative to the housing 120, and a relative rotation phase of the camshaft 320 with respect to the crankshaft 310 is shifted in the retard direction. Further, in this state, the advance ports 28 are not in communication with the advance supply ports SP2 but in communication with the recycling ports 47. As a result, the hydraulic oil discharged from the advance chambers 142 is returned to the retard supply ports SP1 through the recycling ports 47 and recirculated. Further, a part of the hydraulic oil discharged from the advance chambers 142 flows into the drain passage 53 through the drain inlet 54, and is returned to the oil pan 352 through the drain outlet 55.

When the solenoid is energized and the spool 50 is located at the farthest position from the electromagnetic portion 162 of the solenoid 160 as shown in FIG. 8, i.e., when the spool is in contact with the stopper 49, the advance ports 28 are in communication with the advance supply ports SP2. As a result, the hydraulic oil in the hydraulic oil supply passage 25 is supplied into the advance chambers 142, the vane rotor 130 rotates in the advance direction relative to the housing 120, and the relative rotation phase of the camshaft 320 with respect to the crankshaft 310 is shifted in the advance direction. Further, in this state, the retard ports 27 are not in communication with the retard supply ports SP1 but in communication with the recycling ports 47. As a result, the hydraulic oil discharged from the retard chambers 141 is returned to the advance supply ports SP2 through the recycling ports 47 and recirculated. Further, a part of the hydraulic oil discharged from the retard chambers 141 flows into the drain passage 53 through the drain inlet 54, and is returned to the oil pan 352 through the drain outlet 55.

Figure 9:
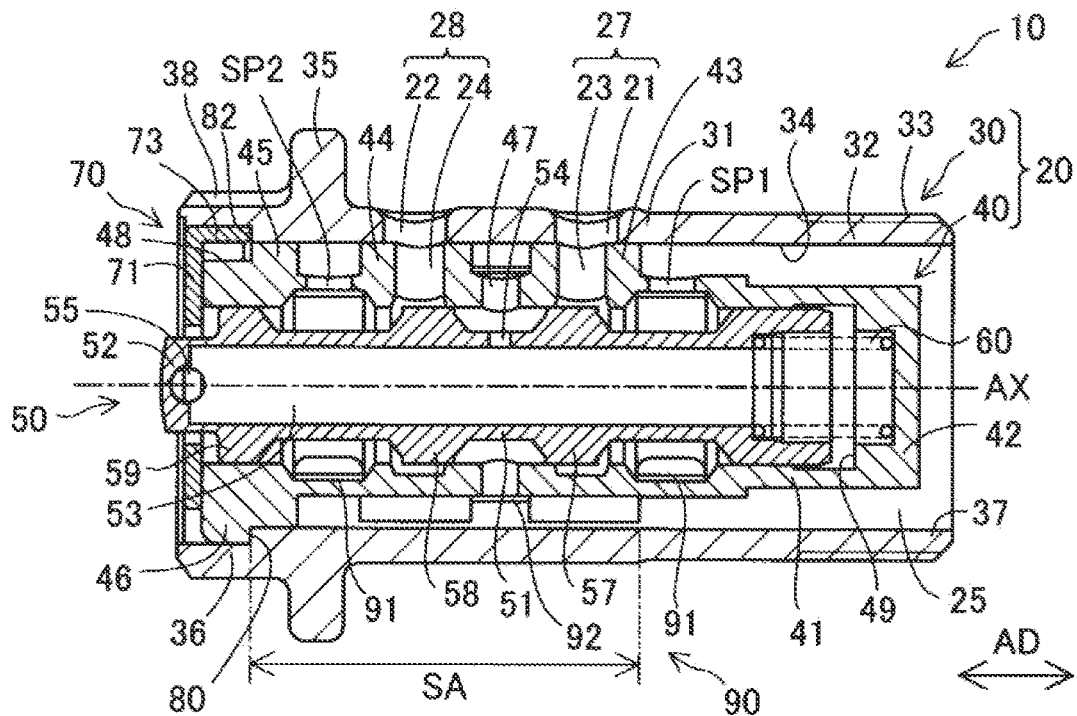
FIG. 9 is a cross-sectional view showing a state where the spool is located substantially at a center in a sliding area.

Further, as shown in FIG. 9, when the solenoid 160 is energized and the spool 50 is located substantially in the center of the sliding area, the retard ports 27 are in communication with the retard supply ports SP1 and the advance ports 28 are in communication with the advance supply ports SP2. As a result, the hydraulic oil in the hydraulic oil supply passage 25 is supplied to both the retard chambers 141 and the advance chambers 142, the vane rotor 130 is restricted from rotating relative to the housing 120, and the relative rotation phase of the camshaft 320 with respect to the crankshaft 310 is maintained.

The hydraulic oil supplied to the retard chambers 141 or the advance chambers 142 flows into the housing hole 132 through the retard chamber pin control oil channel 133 or the advance chamber pin control oil channel 134. Therefore, when sufficient hydraulic pressure is applied to the retard chambers 141 or the advance chambers 142, the lock pin 150 comes off from the fitting recessed portion 128 against the biasing force of the spring 151 by the hydraulic oil flowing into the housing hole 132. As a result, the vane rotor 130 is allowed to rotate relative to the housing 120.

When the relative rotation phase of the camshaft 320 is advanced from the target phase, the valve timing adjustment device 100 sets an energizing amount to the solenoid 160 to a relatively small value and rotate the vane rotor 130 in the retard direction relative to the housing 120. As a result, the relative rotation phase of the camshaft 320 with respect to the crankshaft 310 is shifted in the retard direction and the valve timing is retarded. Further, when the relative rotation phase of the camshaft 320 is retarded from the target value, the valve timing adjustment device 100 sets the energization amount to the solenoid 160 to a relatively large value and rotates the vane rotor 130 in the advance direction relative to the housing 120. As a result, the relative rotation phase of the camshaft 320 with respect to the crankshaft 310 is shifted in the advance direction and the valve timing is advanced. Further, when the relative rotation phase of the camshaft 320 matches the target phase, the valve timing adjustment device 100 sets the energization amount to the solenoid 160 to a medium value and restricts the vane rotor 130 from rotating relative to the housing 120. As a result, the relative rotation phase of the camshaft 320 with respect to the crankshaft 310 is maintained and the valve timing is maintained.

According to the hydraulic oil control valve 10 of the valve timing adjustment device 100 of the first embodiment described above, the fixing member 70 fixed to the outer sleeve 30 is configured to restrict the inner sleeve 40 from rotating in the circumferential direction relative to the outer sleeve 30 and to restrict the inner sleeve 40 and the spool 50 from coming off from the outer sleeve 30 toward the solenoid 160 in the axial direction AD. That is, the single member can serve as the rotation stopper of the inner sleeve 40, the stopper of the inner sleeve 40, and the stopper of the spool 50. Therefore, it is possible to suppress an increase in the number of members of the hydraulic oil control valve 10 as compared with a configuration in which the rotation stopper of the inner sleeve 40, the stopper of the inner sleeve 40, and the stopper of the spool 50 are realized by different members. Further, in comparison with a configuration in which the rotation stopper of the inner sleeve 40, the stopper of the inner sleeve 40, and the stopper of the spool 50 are realized by two or more different mechanisms, the manufacturing process of the hydraulic oil control valve 10 can be simplified. Further, since the fixing member 70 can restrict the inner sleeve 40 from rotating and restrict the inner sleeve 40 and the spool 50 from coming off, it is possible to simplify the shape of the outer sleeve 30. Therefore, it is possible to suppress an increase in the cost required for restricting the inner sleeve 40 and the spool 50 from coming off toward the solenoid 160 and restricting the inner sleeve from rotating relative to the outer sleeve 30.

Further, since the fixing member 70 is fixed to the outer sleeve 30, it is possible to prevent an excessive load from being applied to the inner sleeve 40 for fixing the fixing member 70. Therefore, a deformation of the inner sleeve 40 can be suppressed and a deterioration of the slidability of the spool 50 can be suppressed.

Further, at least one of a gap between the fixing member 70 and the first contact portion CP1 and a gap between the movement restricting portion 80 and the second contact portion CP2 is defined in the axial direction AD. Thus, when a coefficient of linear expansion of the inner sleeve 40 is larger than that of the outer sleeve 30, it is possible to prevent a load from being applied from the inner sleeve 40 to the fixing member 70 and the movement restricting portion 80 due to a temperature change. Therefore, it is possible to prevent a reliability of the function of the fixing member 70 and the function of the movement restricting portion 80 from decreasing. Further, a fixing load is applied to the fixing member 70 during the assembly. However, since the gap is defined, the fixing load is restricted from being applied to the inner sleeve 40. Therefore, a deformation of the inner sleeve 40 due to the fixing load can be suppressed and the deterioration of the slidability of the spool 50 can be suppressed. On the other hand, during an operation of the engine, the inner sleeve 40 is pushed toward the fixing member 70 by the hydraulic pressure supplied through the supply inlet 326. By setting a pressing force generated by the supplied hydraulic pressure and an area of a pressure receiving portion of the inner sleeve to a value larger than a load generated by the spring 60 or the solenoid 160, the inner sleeve 40 can be pressed against the fixing member 70. Therefore, a performance variation of the valve timing adjustment device 100 due to the gap can be suppressed.

Further, since the outer sleeve 30 includes the positioning portions 82 in contact with the fixing member 70 in the axial direction AD, the position of the fixing member 70 in the axial direction AD can be determined. Therefore, the gap between the fixing member 70 and the first contact portion CP1 and/or the gap between the movement restricting portion 80 and the second contact portion CP2 in the axial direction AD can be easily formed and it is possible to suppress a load from being applied to the inner sleeve 40 in the axial direction AD. Further, the stepped portion in the radial direction on the inner circumferential surface of the outer sleeve 30, which is defined by the large diameter portion 36, has both functions as the movement restricting portion 80 and the positioning portion 82. Thus, a configuration for realizing the movement restricting portion 80 and the positioning portion 82 can be simplified.

Further, since the inner diameter of the main body 31 of the outer sleeve 30 is substantially constant in the sealing area SA, an inner surface processing of the main body 31 of the outer sleeve 30 in the sealing area SA, which requires a dimensional accuracy, can be simplified. Therefore, since the inner surface of the main body 31 of the outer sleeve 30 can be processed by polishing, reamer processing, or the like, it is possible to suppress an increase in the processing process and an increase in the manufacturing cost of the outer sleeve 30. Further, since the axial hole 34 of the outer sleeve 30 passes through the outer sleeve 30 in the axial direction AD and the non-arranged portion 37 of the outer sleeve 30 has the inner diameter that is larger than that of the inner sleeve 40, the outer sleeve 30 can be easily manufactured by forging or can be easily manufactured with a tubular member. Therefore, it is possible to suppress an increase in the processing process of the outer sleeve 30, and it is possible to suppress an increase in the manufacturing cost of the outer sleeve 30.

Further, since the fixing member 70 having the flat plate portion 71 and the fitting protrusions 73 is provided, it is possible to suppress the structure of the fixing member 70 from becoming complicated and to suppress an increase in the manufacturing cost of the fixing member 70. Further, since the flange portion 46 of the inner sleeve 40 is arranged in the large diameter portion 36 of the outer sleeve 30, the stepped portion defined by the large diameter portion 36 can serve as the movement restricting portion 80 and restrict the inner sleeve 40 from moving away from the solenoid 160 in the axial direction AD. Further, the inner sleeve 40 is restricted from coming off toward the solenoid 160 and from moving toward the camshaft 320 by holding the flange portion 46 of the inner sleeve 40 between the outer sleeve 30 and the fixing member 70. As a result, positioning in the assembly is suppressed from becoming complicated and the assembly accuracy can be improved. Further, since the movement restricting portion 80 is located between the protrusion 35 of the outer sleeve 30 and the solenoid 160 in the axial direction AD, it is not necessary to provide the movement restricting portion at the fixing portion 32 of the outer sleeve 30 and a shape of the fixing portion 32 can be easily changed depending on a shape of the end portion 321 of the camshaft 320 and a shape of the shaft hole portion 322.

Further, since the fixing member 70 has the deformed portions 74, the fixing member 70 can be fixed to the outer sleeve 30 by being deformed. Therefore, the dimensional accuracy between the fixing member 70 and the outer sleeve 30 can be relaxed as compared with a dimensional accuracy required for a mode of fixing such as press fitting or the like. Thus, an increase in manufacturing cost can be suppressed. Further, since the deformed portions 74 of the fixing member 70 are deformed at the positions corresponding to the peaks 39 of the tool engaging portion 38 of the outer sleeve 30 in the circumferential direction, the tool engaging portion 38 is restricted from being deformed due to the deformation of the deformed portions 74.

Further, since the sleeve 20 has a double-structure including the outer sleeve 30 and the inner sleeve 40, the hydraulic oil supply passage 25 can be easily defined by a space between the axial hole 34 formed in the outer sleeve 30 and the inner sleeve 40. Therefore, as compared with a configuration in which an inside of the spool serves as the hydraulic oil supply passage, it is possible to suppress the hydraulic pressure from being applied to the spool 50 when supplying the hydraulic oil and to suppress deterioration of the slidability of the spool 50. Further, since the sleeve 20 has the double-structure, the ports SP1, SP2, 23, 24, and 47 can be easily defined in the inner sleeve 40. Therefore, the workability of each of the ports SP1, SP2, 27, 28, and 47 in the sleeve 20 can be improved and the manufacturing process of the sleeve 20 can be restricted from becoming complicated. Further, since the workability can be improved, the degree of freedom in designing each port SP1, SP2, 27, 28, 47 can be improved, and the mountability of the hydraulic oil control valve 10 and the valve timing adjustment device 100 can be improved.

B. Second Embodiment

Figure 10:
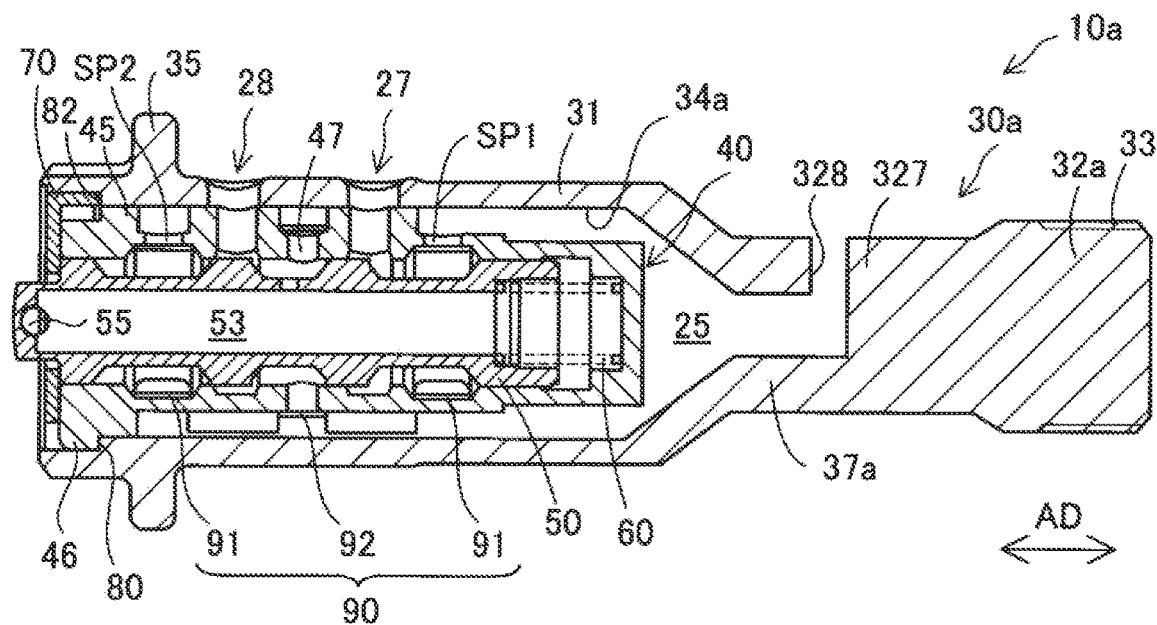
FIG. 10 is a cross-sectional view showing a schematic configuration of a hydraulic oil control valve of a second embodiment.

A hydraulic oil control valve 10a of a second embodiment shown in FIG. 10 is different from the hydraulic oil control valve 10 of the first embodiment in that an outer sleeve 30a is provided instead of the outer sleeve 30. Since the other configurations are the same as those in the first embodiment, the same configurations are designated by the same reference numerals, and detailed description thereof will be omitted.

The outer sleeve 30a of the hydraulic oil control valve 10a of the second embodiment has a supply portion 327 between the main body 31 and the fixing portion 32a in the axial direction AD. At least a portion of the supply portion 327 in the axial direction AD constitutes a non-arranged portion 37a inside which the inner sleeve 40 is not arranged in the radial direction. Further, the supply portion 327 defines a supply hole 328 that opens in the radial direction to pass through the outer sleeve 30a between an outer circumferential surface of the supply portion 327 and an axial hole 34a. Hydraulic oil is supplied into the supply hole 328 from the hydraulic oil supply source 350. The fixing portion 32a has a columnar appearance and does not define the axial hole 34a. Therefore, the axial hole 34a does not pass through the outer sleeve 30a in the axial direction AD. In the present embodiment, the supply portion 327 and the fixing portion 32a are formed to have outer diameters less than that of the main body 31, but may have outer diameters substantially the same as that of the main body 31.

According to the hydraulic oil control valve 10a of the second embodiment described above, effects similar to those of the hydraulic oil control valve 10 of the first embodiment are obtained. In addition, since the hydraulic oil control valve 10 includes the supply portion 327 defining the supply hole 328, a length of the supply portion 327 in the axial direction AD can be adjusted and designed depending on the configuration of the camshaft 320. Thus, the degree of freedom of the design of the hydraulic oil control valve 10 can be improved.

C. Third Embodiment

Figure 11:
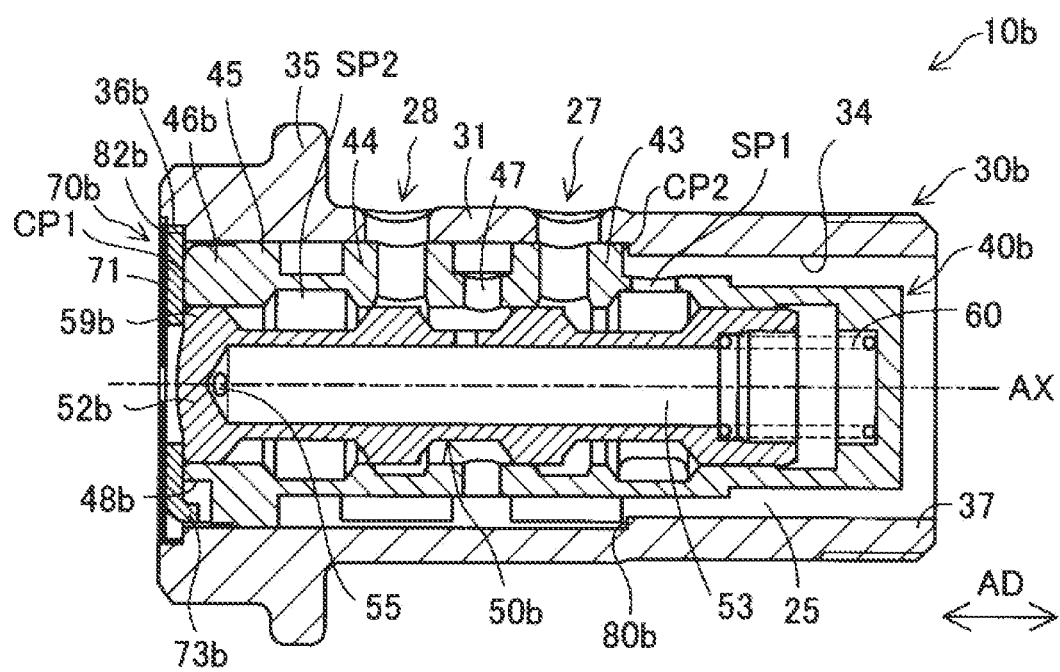
FIG. 11 is a cross-sectional view showing a schematic configuration of a hydraulic oil control valve of a third embodiment.

A hydraulic oil control valve 10b of the third embodiment shown in FIG. 11 is different from the hydraulic oil control valve 10 of the first embodiment in that the hydraulic oil control valve 10b has an outer sleeve 30b, an inner sleeve 40b, a spool 50b, and a fixing member 70b instead of the outer sleeve 30, the inner sleeve 40, the spool 50, and the fixing member 70. Since the other configurations are the same as those in the first embodiment, the same configurations are designated by the same reference numerals, and detailed description thereof will be omitted.

The outer sleeve 30b of the hydraulic oil control valve 10b of the third embodiment is formed so that the length of the large diameter portion 36b in the axial direction AD is short. In addition, the outer sleeve 30b has a movement restricting portion 80b instead of the movement restricting portion 80. That is, the radial step formed by the large diameter portion 36b on the inner peripheral surface of the outer sleeve 30b does not function as the movement restricting portion 80, but only functions as the positioning portion 82b. The movement restricting portion 80b is formed on the inner circumferential surface of the outer sleeve 30b and located between the camshaft 320 and the retard protruding walls 43 of the inner sleeve 40b in the axial direction AD. The movement restricting portion 80b has an inner diameter that is less than other portion of the main body 31. The positioning portion 82b comes into contact with the end portion of the fitting protrusions 73b of the fixing member 70b in the axial direction AD.

Figure 12:
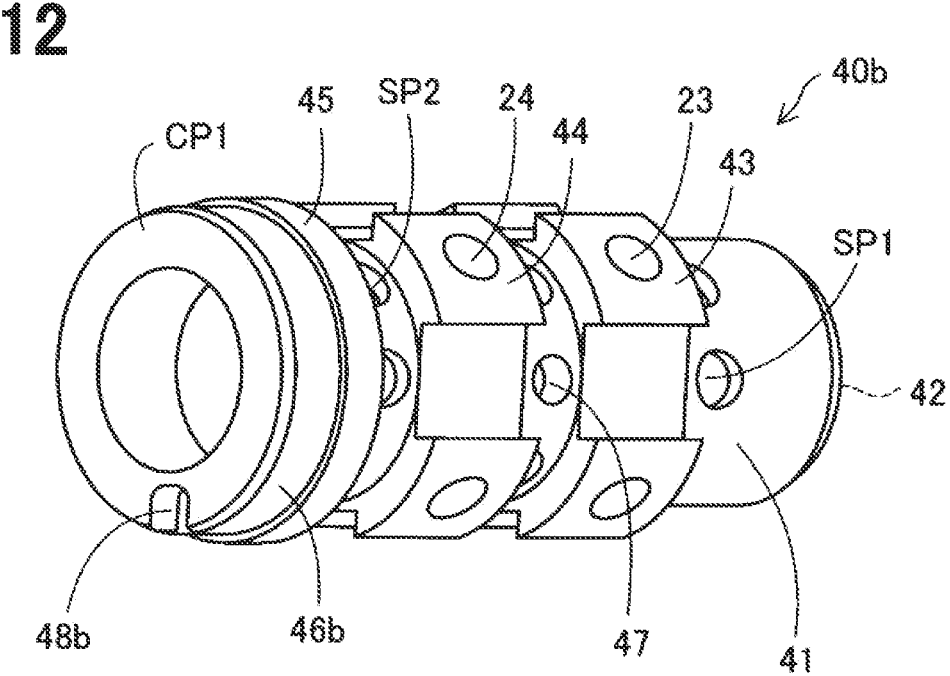
FIG. 12 is a perspective view showing a schematic configuration of an inner sleeve of a third embodiment.

As shown in FIG. 12, the inner sleeve 40b has a locking end portion 46b instead of the flange portion 46 at the end portion facing the solenoid 160. The locking end portion 46b has an outer diameter that is less than an inner diameter of the main body 31 of the outer sleeve 30b and that is substantially equal to the outer diameters of the retard protruding walls 43, the advance protruding walls 44, and the sealing wall 45. An end surface of the locking end portion 46b facing the solenoid 160 serves as the first contact portion CP1. The first contact portion CP1 is configured to come into contact with the fixing member 70b. The locking end portion 46b has a fitting portion 48b. In the present embodiment, the fitting portion 48b is recessed from a portion, in the circumferential direction, of an outer edge of the end surface of the locking end portion 46b facing the solenoid 160. The fitting protrusion 73b of the fixing member 70b fits into the fitting portion 48b. As shown in FIG. 11, end surfaces of the retard protruding walls 43 of the inner sleeve 40b closer to the camshaft 320 serve as the second contact portion CP2. The second contact portion CP2 is configured to come in contact with the movement restricting portion 80b.

The spool 50b has a spool bottom portion 52b and a stopper 59b instead of the spool bottom portion 52 and the stopper 59. The spool bottom portion 52b is located between the camshaft 320 and the fixing member 70b. The stopper 59b protrudes radially outward from the spool bottom portion 52b.

Figure 13:
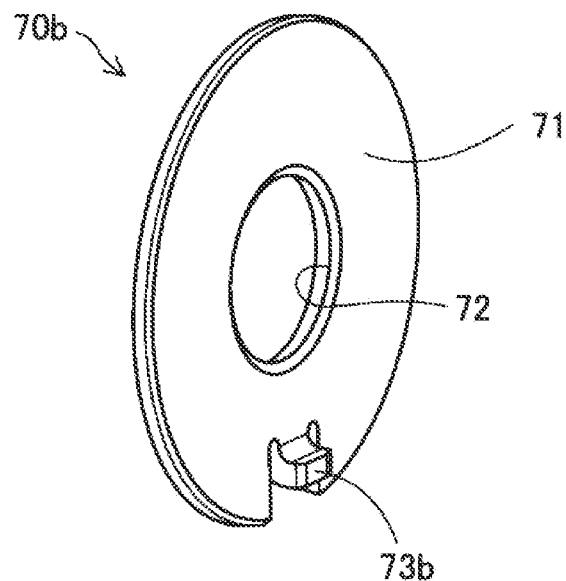
FIG. 13 is a perspective view showing a schematic configuration of a fixing member of the third embodiment.

As shown in FIG. 13, the fixing member 70b has a thin plate appearance, and includes the single fitting protrusion 73b instead of the multiple fitting protrusions 73. The fitting protrusion 73b is formed by bending a part of the flat plate portion 71 so as to protrude from the flat plate portion 71 in the axial direction AD. The fitting protrusion 73b fits into the fitting portion 48b of the inner sleeve 40b.

In a state where the fixing member 70b is deformed and fixed to the outer sleeve 30b, a gap between the fixing member 70b and the first contact portion CP1 and/or a gap between the movement restricting portion 80b and the second contact portion CP2 is defined in the axial direction AD. In other words, in the state where the fixing member 70b is deformed and fixed to the outer sleeve 30b, a dimension in the axial direction AD between an end surface of the flat plate portion 71 of the fixing member 70b facing the first contact portion CP1 and an end surface of the movement restricting portion 80b facing the second contact portion CP2 is slightly larger than a dimension in the axial direction AD between the first contact portion CP1 and the second contact portion CP2 of the inner sleeve 40b.

According to the hydraulic oil control valve 10b of the third embodiment described above, effects similar to those of the hydraulic oil control valve 10 of the first embodiment can be obtained. In addition, since the flange portion 46 of the inner sleeve 40b is omitted, cutting processing for forming the flange portion 46 and the like can be omitted, and an increase in the manufacturing cost of the inner sleeve 40b can be suppressed. Further, since the thin plate-shaped fixing member 70b is provided, the configuration of the fixing member 70b can be simplified, and an increase in the manufacturing cost of the fixing member 70b can be suppressed.

D. Fourth Embodiment

Figure 14:
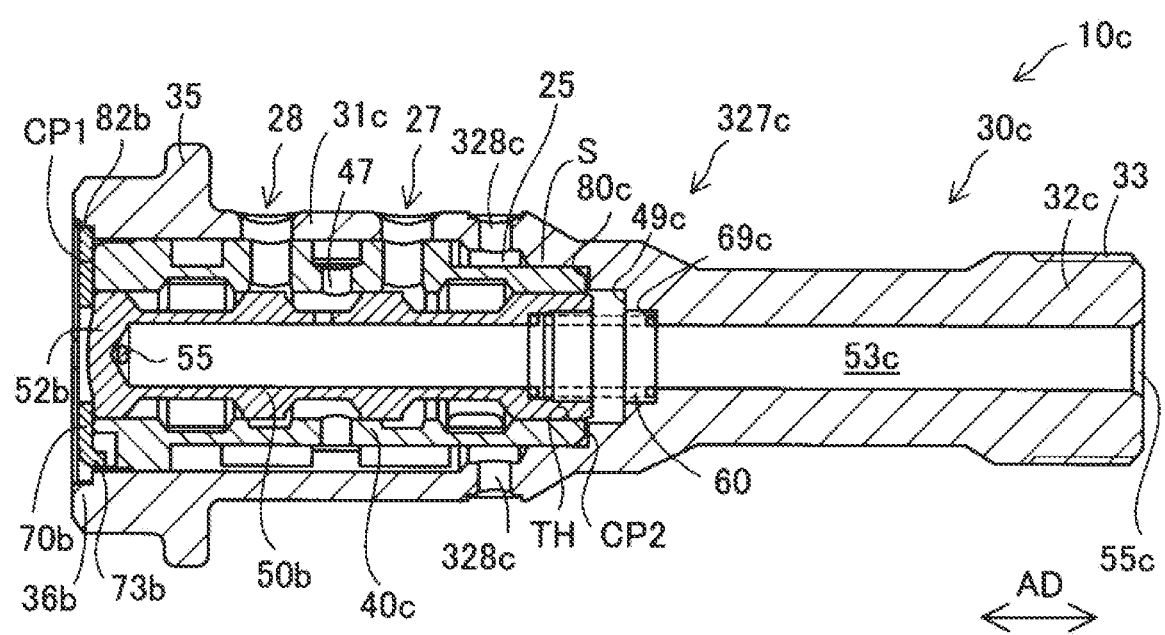
FIG. 14 is a cross-sectional view showing a schematic configuration of a hydraulic oil control valve of a fourth embodiment.

A hydraulic oil control valve 10c of a fourth embodiment shown in FIG. 14 is different from the hydraulic oil control valve 10b of the third embodiment in the configuration of the hydraulic oil supply mechanism, the hydraulic oil discharge mechanism, and a movement restricting portion 80c. More specifically, it differs from the hydraulic oil control valve 10b of the third embodiment in that an outer sleeve 30c and an inner sleeve 40c are provided instead of the outer sleeve 30b and the inner sleeve 40b. Since the other configurations are the same as those in the third embodiment, the same configurations are designated by the same reference numerals, and detailed description thereof will be omitted.

The outer sleeve 30c of the hydraulic oil control valve 10c of the fourth embodiment has a main body 31c and a fixing portion 32c instead of the main body 31 and the fixing portion 32, and includes a small diameter portion 327c connecting between the main body 31c and the fixing portion in the axial direction AD.

The main body 31c defines a supply hole 328c between the outer retard ports 21 and the camshaft 320 in the axial direction AD. The supply hole 328c passes through the main body 31c between an outer circumferential surface and an inner circumferential surface of the main body 31c. Hydraulic oil is supplied into the supply hole 328c from the hydraulic oil supply source 350.

The fixing portion 32c has an outer diameter and an inner diameter each of which is smaller than that of the main body 31c. An inside space of the fixing portion 32c serves as a drain passage 53c. The end portion of the fixing portion closer to the camshaft 320 defines a second drain outlet 55c. The hydraulic oil in the drain passage 53c is discharged from the hydraulic oil control valve 10c through the second drain outlet 55c and the shaft hole portion 322 defined in the camshaft 320.

The small diameter portion 327c has the outer diameter and the inner diameter each of which is smaller than that of the main body 31c. The small diameter portion 327c has a sealing portion S, a movement restricting portion 80c, a stopper 49c, and a spring contact portion 69c. The sealing portion S, the movement restricting portion 80c, the stopper 49c, and the spring contact portion 69c are arranged in the axial direction AD in this order from the solenoid 160, and the inner diameter of the small diameter portion 327c is reduced in steps.

The sealing portion S separates the hydraulic oil supply passage 25 from the drain passage 53c. The inner diameter of the sealing portion S is substantially the same as the outer diameter of the end portion of the inner sleeve 40c closer to the camshaft 320. The movement restricting portion 80c is configured to come into contact with the second contact portion CP2, which is the end surface of the inner sleeve 40c closer to the camshaft 320. The movement restricting portion 80c restricts the inner sleeve 40c from moving away from the solenoid 160 in the axial direction AD. The stopper 49c is configured to come into contact with the end portion of the spool 50b closer to the camshaft 320. The stopper 49c defines a sliding limit of the spool 50b in a direction away from the electromagnetic portion 162 of the solenoid 160. One end of the spring 60 is in contact with the spring contact portion 69c. An inside space of the small diameter portion 327c serves as the drain passage 53c.

The inner sleeve 40c does not have the bottom portion 42. Therefore, the end portion of the inner sleeve 40c closer to the camshaft 320 defines an opening TH passing through the inner sleeve 40c in the axial direction AD. The end portion of the spool 50b closer to the camshaft 320 is inserted into the opening TH. In the present embodiment, the inner sleeve 40c has a length in the axial direction AD that is substantially the same as a length of the spool 50b. However, the length of the inner sleeve 40c may be longer or shorter than that of the spool 50b within a range in which a function of the sealing portion S can be secured.

According to the hydraulic oil control valve 10c of the fourth embodiment described above, effects similar to those of the hydraulic oil control valve 10b of the third embodiment can be obtained. In addition, since the inner sleeve 40c does not have the bottom portion 42 and defines the opening portion TH, the length of the inner sleeve 40c in the axial direction AD can be shortened. Therefore, the degree of freedom in designing the hydraulic oil control valve 10c can be improved and the mountability of the hydraulic oil control valve 10c can be improved.

E. Fifth Embodiment

Figure 15:
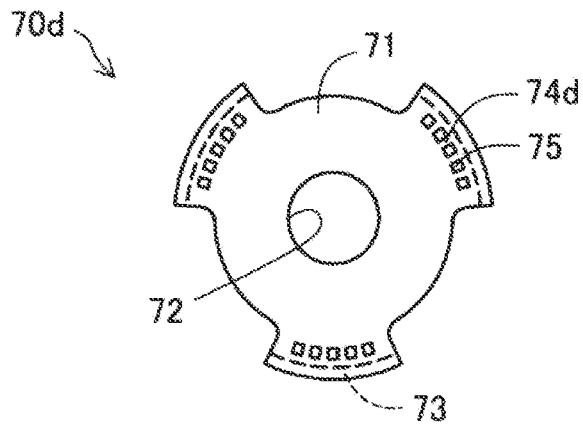
FIG. 15 is a front view showing a schematic configuration of a fixing member of a fifth embodiment.

As shown in FIG. 15, a fixing member 70d of a hydraulic oil control valve of a fifth embodiment is different from the fixing member 70 of the hydraulic oil control valve 10 of the first embodiment in that the fixing member 70d has deformed portions 74d in place of the deformed portions 74. Since the other configurations are the same as those in the first embodiment, the same configurations are designated by the same reference numerals, and detailed description thereof will be omitted. FIG. 15 is a front view of the fixing member 70d viewed from the solenoid 160 in a similar way to FIG. 5.

The deformed portions 74d of the fixing member 70d have rough surfaces 75 that are recessed and protrude in the axial direction AD. In the present embodiment, each of multiple protrusions and/or recessed portions substantially has a rectangular cross-section. The protrusions and the recessed portions are located in portions of the fixing member 70d including positions corresponding to the peaks 39 of the tool engaging portion 38 of the outer sleeve 30 in the circumferential direction. A protruding direction of the protrusions or a recessed direction of the recessed portions is not limited to the axial direction AD and may be a direction intersecting the radial direction. In addition, it is not limited to that each of the deformed portions 74d has the multiple protrusions and/or recessed portions. Each of the deformed portions 74d may has a single protrusion or recessed portion.

According to the hydraulic oil control valve including the fixing member 70d of the fifth embodiment described above, similar effects as those of the hydraulic oil control valve 10 of the first embodiment can be obtained. In addition, since the deformed portions 74d of the fixing member 70d have rough surfaces that protrude and/or are recessed in the axial direction AD, the fixing member 70d is further restricted from rotating in the circumferential direction relative to the outer sleeve 30 when the fixing member 70d is deformed and fixed to the outer sleeve 30. Therefore, it is possible to prevent the inner sleeve 40 from rotating in the circumferential direction with respect to the outer sleeve 30, and it is possible to increase the fixing strength in the circumferential direction.

F. Sixth Embodiment

Figure 16:
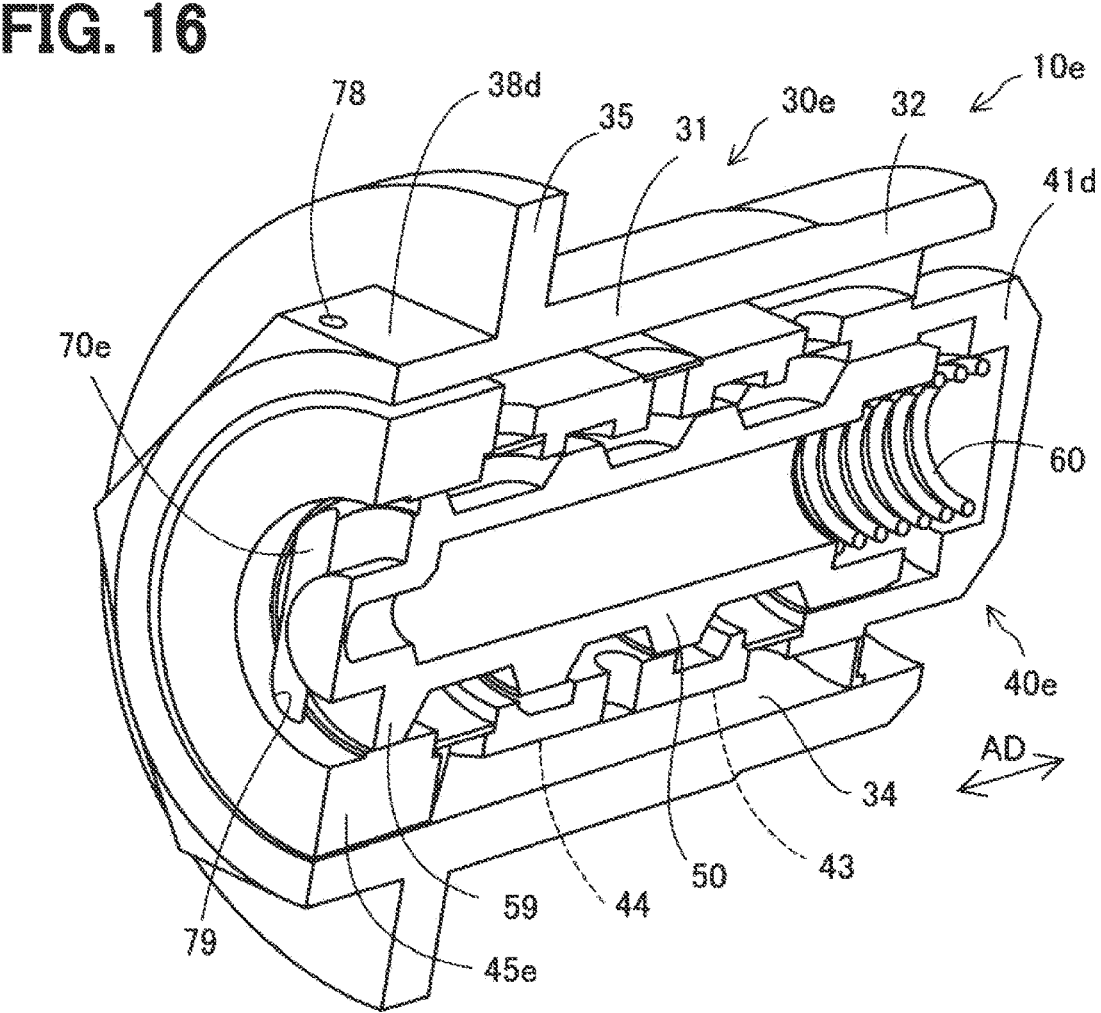
FIG. 16 is a perspective view showing a schematic configuration of a hydraulic oil control valve of a sixth embodiment.

A hydraulic oil control valve 10e of a sixth embodiment shown in FIG. 16 is different from the hydraulic oil control valve 10 in that the hydraulic oil control valve 10e includes a fixing member 70e in place of the fixing member 70, that the fixing member 70e further has a function as the movement restricting portion, and that the fixing member 70e has a different fixing mechanism. The fixing mechanism of the fixing member 70e is different from that of the hydraulic oil control valve 10 of the first embodiment in that an outer sleeve 30e and an inner sleeve 40e are provided in place of the outer sleeve 30 and the inner sleeve 40. Since the other configurations are the same as those in the first embodiment, the same configurations are designated by the same reference numerals, and detailed description thereof will be omitted.

The fixing member 70e is configured as a rod-shaped pin. The fixing member 70e is arranged on a side of both the protrusion 35 of the outer sleeve 30e and the stopper 59 of the spool 50 closer to the solenoid 160 to pass through the outer sleeve 30e and the inner sleeve 40e. In the present embodiment, the fixing member 70e substantially has a cylindrical shape, but the shape of the fixing member 70e is not limited to the cylindrical shape and may be an arbitrary rod-shape such as a quadrangular prism shape.

The tool engaging portion 38e of the outer sleeve 30e defines an outer through hole 78. The outer through hole 78 passes through the outer sleeve 30e between an outer circumferential surface and an inner circumferential surface of the outer sleeve 30e. The fixing member 70e is inserted and fixed into the outer through hole 78. In the present embodiment, the outer sleeve 30e does not include the large diameter portion 36. Therefore, the inner diameter of the outer sleeve 30e is substantially the same entirely in the axial direction AD.

The inner sleeve 40e has a locking end portion 45e instead of the flange portion 46. The locking end portion 45e has an outer diameter that is less than the inner diameter of the outer sleeve 30e and that is substantially the same as the outer diameters of the retard protruding walls 43 and the advance protruding walls 44. The locking end portion 45e defines an inner through hole 79. The inner through hole 79 passes through the inner sleeve 40e between an outer circumferential surface and an inner circumferential surface of the inner sleeve 40e. The fixing member 70e is inserted into the inner through hole 79.

In the present embodiment, each of the outer through hole 78 and the inner through hole 79 substantially has a circular cross-section. However, the cross-sectional shape of each of the outer through hole 78 and the inner through hole 79 is not limited to the circular shape and may be any shape corresponding to a cross-sectional shape of the fixing member 70e.

In the hydraulic oil control valve 10e of the sixth embodiment, the fixing member 70e also serves as the movement restricting unit. By arranging the fixing member 70e to pass through the outer sleeve 30e and the inner sleeve 40e, the inner sleeve 40e can be restricted from rotating, from coming off toward the solenoid 160, and from moving toward the camshaft 320. In the present embodiment, an inner circumferential surface of the inner through hole 79 of the inner sleeve 40e serves as both the first contact portion CP1 and the second contact portion CP2. Further, there is a gap in the axial direction AD between the inner circumferential surface of the inner through hole 79 and an outer circumferential surface of the fixing member 70e inserted into the inner through hole 79.

By arranging the fixing member 70e to pass through the outer sleeve 30e and the inner sleeve 40e on a side of the locking portion 59 of the spool 50, the spool 50 is restricted from coming off toward the solenoid 160. That is, the sliding of the spool 50 in the direction toward the electromagnetic portion 162 of the solenoid 160 is restricted by a contact between the fixing member 70e and the locking portion 59.

According to the hydraulic oil control valve 10e of the sixth embodiment described above, effects similar to those of the hydraulic oil control valve 10 of the first embodiment can be obtained. In addition, since the fixing member 70e is a rod-shaped pin and has a function as the movement restricting portion, the single member can restrict the inner sleeve 40e from moving away from the solenoid 160 in the axial direction AD in addition to restricting the inner sleeve 40e from rotating and restricting the inner sleeve 40e and the spool from coming off. Therefore, it is possible to further suppress an increase in the manufacturing cost of the hydraulic oil control valve 10e.

Further, since the fixing member 70e is formed as a rod-shaped pin and is arranged to pass through the outer sleeve 30e and the inner sleeve 40e, it is possible to simplify the shapes of the outer sleeve 30e and the inner sleeve 40e. Further, since the inner diameter of the outer sleeve 30e is formed to be substantially the same entirely in the axial direction AD, it is possible to further suppress the complexity of the inner surface processing of the main body 31 of the outer sleeve 30. Further, since the inner sleeve 40e does not have the flange portion 46, cutting processing for forming the flange portion 46 and the like can be omitted, and an increase in the manufacturing cost of the inner sleeve 40e can be suppressed. Further, since the fixing member 70e as the movement restricting portion is provided between the protrusion 35 of the outer sleeve 30 and the solenoid 160 in the axial direction AD, it is not necessarily to dispose the movement restricting portion at the fixing portion 32 of the outer sleeve 30. Thus, the shape of the fixing portion 32 can be easily changed according to shapes of the end portion 321 of the camshaft 320 and the shaft hole portion 322.

G. Seventh Embodiment

Figure 17:
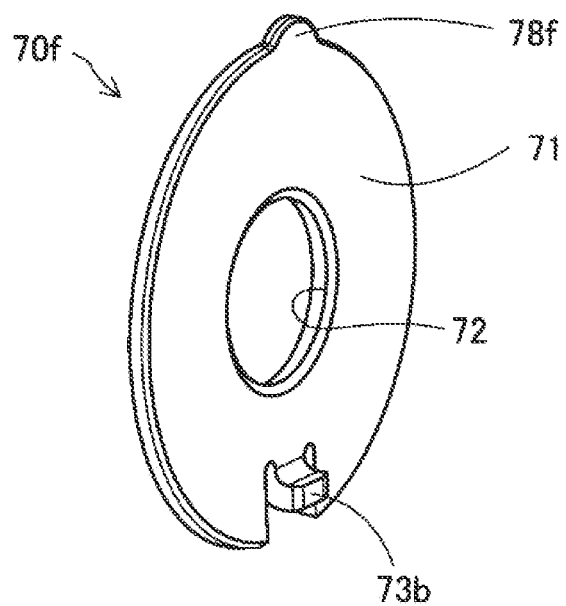
FIG. 17 is a perspective view showing a schematic configuration of a fixing member of a seventh embodiment.

As shown in FIG. 17, a fixing member 70f of a hydraulic oil control valve of a seventh embodiment is different from the fixing member 70b of the hydraulic oil control valve 10b of the third embodiment in that the fixing member 70f further includes a first fitting portion 78f. Since the other configurations are the same as those in the third embodiment, the same configurations are designated by the same reference numerals, and detailed description thereof will be omitted.

The first fitting portion 78f is a protrusion protruding radially outward from the flat plate portion 71. The first fitting portion 78f is configured to fit to a second fitting portion (not shown) formed at an end portion of the outer sleeve 30b facing the solenoid 160. The second fitting portion may be a recessed portion recessed radially outward. The first fitting portion 78f of the fixing member 70f may be configured as a recessed portion and the second fitting portion of the outer sleeve 30b may be configured as a protrusion. The shapes of the first fitting portion 78f and the second fitting portion are arbitrary determined while the first fitting portion 78f can fit with the second fitting portion.

According to the hydraulic oil control valve including the fixing member 70f of the seventh embodiment described above, effects similar to those of the hydraulic oil control valve 10b of the third embodiment can be obtained. In addition, since the first fitting portion 78f formed on the fixing member 70f fits with the second fitting portion formed on the outer sleeve 30b, the fixing member 70f restricted from rotating in the circumferential direction relative to the outer sleeve 30b. Further, since the first fitting portion 78f is configured as the protrusion, it is possible to suppress the processing of forming the second fitting portion on the outer sleeve from being complicated.

H. Other Embodiments

In the first, second, and fifth embodiments, the fixing member 70 and 70d has multiple fitting protrusions 73, but the present disclosure is not limited to this. The fixing member 70, 70d may have a single fitting protrusion 73. Further, in the third and fourth embodiments, the fixing member 70b has the single fitting protrusion 73b, but the present disclosure is not limited to this. The fixing member 70b may have multiple fitting protrusions 73b. Further, in the third and fourth embodiments, the fitting portion 48b of the inner sleeve 40b, 40c is formed on the outer edge of the end surface of the locking end portion 46b facing the solenoid 160. However, the fitting portion 48b may be formed on an arbitrary portion on the end surface of the fitting end portion 46b facing the solenoid 160 instead of the outer edge. Further, the first fitting portion 78f formed on the fixing member 70f of the seventh embodiment may be formed on the fixing members 70 and 70d of the first, second and fifth embodiments. Such a configuration also achieves the same effects as those of the embodiment described above.

In the first to fifth embodiments, the fixing members 70, 70b, and 70d are deformed and fixed at positions corresponding to the peaks 39 of the tool engaging portion 38, but the positions are not limited to positions corresponding to the peaks 39. The fixing members 70, 70b, and 70d may be deformed and fixed at any arbitrary positions in the circumferential direction. Further, fixing method for the fixing members 70, 70b, 70d is not limited to deformed fixing, and the fixing members 70, 70b, 70d may be fixed to the outer sleeves 30, 30a, 30b, 30c by welding or the like. Such a configuration also achieves the same effects as those of the first to fifth embodiments described above.

In the third and sixth embodiments, a gap between the fixing member 70b, 70e and the first contact portion CP1 and/or a gap between the movement restricting portion 80b and the second contact portion CP2 is defined in the axial direction AD. However, the gaps may be omitted. Further, in each of the above embodiments, the inner diameter of the main body 31, 31c of the outer sleeve 30, 30a, 30b, 30c, and 30e is constant at least in the sealing area SA, but may not be constant in the sealing area. Further, in the first, third, and sixth embodiments, the minimum value of the inner diameter of the outer sleeve 30, 30e is larger than the maximum value of the inner diameter of the inner sleeve 40, 40b, 40e. However, the minimum value of the inner diameter of the outer sleeve 30, 30e may be smaller than the maximum value of the inner diameter of the inner sleeve 40, 40b, 40e. Such a configuration also achieves the same effects as those of the embodiment described above.

The configurations of the hydraulic oil control valves 10, 10a, 10b, 10c, and 10e in the above embodiments are examples and can be variously changed. For example, the recycling mechanism with the recycling ports 47 may be omitted. Further, for example, the inside of the spools 50, 50b, 50e may be configured as the hydraulic oil supply passage 25, and a gap in the radial direction between the outer sleeve 30, 30a, 30b, 30c, 30e and the inner sleeve 40, 40b, 40c, 40e may be configured as a drain passage 53, 53c. Further, fixing method to the end portion 321 of the camshaft 320 is not limited to fastening between the male thread portion 33 and the female thread portion 324. The fixing to the end portion 321 of the camshaft 320 may be realized by any method such as welding. Further, the present disclosure is not limited to the solenoid 160 and any actuators such as an electric motor and an air cylinder may drive the hydraulic control valve. Such a configuration also achieves the same effects as those of the embodiment described above.

In each of the above embodiments, the valve timing adjustment device 100 adjusts the valve timing of the intake valve 330 that is opened and closed by the camshaft 320, but the valve timing adjustment device 100 may adjust the valve timing of the exhaust valve 340. Further, the valve timing adjustment device 100 may be fixed to the end portion 321 of the camshaft 320 as a driven shaft to which a driving force is transmitted from the crankshaft 310 as the driving shaft through an intermediate shaft, or may be fixed to one of the end of the drive shaft and the driven shaft of the camshaft having the double structure.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they may be omitted as appropriate.

What is claimed is:

1. A hydraulic oil control valve for a valve timing adjustment device, the valve timing adjustment device being configured to adjust valve timing of a valve and fixed to an end portion of one shaft that is a drive shaft or a driven shaft, the driven shaft being configured to selectively open and close the valve with a driving force transmitted from the drive shaft, the hydraulic oil control valve being coaxially disposed with a rotational axis of the valve timing adjustment device and configured to control a flow of a hydraulic oil supplied from a hydraulic oil supply source, the hydraulic oil control valve comprising:
   a tubular sleeve;
   a spool that has an end portion in contact with an actuator and that located inward of the tubular sleeve in a radial direction and slidably moved by the actuator in an axial direction;
   a movement restricting portion; and
   a fixing member, wherein
   the tubular sleeve includes:
   an inner sleeve disposed radially outside of the spool; and
   an outer sleeve defining an axial hole extending in the axial direction, the inner sleeve being inserted into at least a portion of the axial hole in the axial direction,
   the movement restricting portion is configured to restrict the inner sleeve from moving away from the actuator in the axial direction,
   the fixing member is fixed to an end portion of the outer sleeve facing the actuator, and
   the fixing member is configured to restrict:
   the inner sleeve from moving in a circumferential direction relative to the outer sleeve; and
   the inner sleeve and the spool from coming off from the outer sleeve toward the actuator in the axial direction,
   the fixing member includes:
   a flat plate portion having a flat plate shape extending in a direction intersecting the axial direction; and a fitting protrusion protruding from the flat plate portion in a direction intersecting the radial direction, the inner sleeve includes a fitting portion at an end portion of the inner sleeve closer to the actuator, and the fitting protrusion is configured to fit into the fitting portion of the inner sleeve, the fixing member includes a first fitting portion configured to restrict the fixing member from moving in the circumferential direction relative to the outer sleeve, the outer sleeve includes a second fitting portion configured to fit with the first fitting portion; and the first fitting portion is a protrusion protruding radially outward from the flat plate portion and being flush with the flat plate portion.

2. The hydraulic oil control valve according to claim 1, wherein the outer sleeve includes a positioning portion in contact with the fixing member in the axial direction.

3. The hydraulic oil control valve according to claim 1, wherein a gap between the inner sleeve and the outer sleeve is sealed in a sealing area, and the outer sleeve has an inner diameter that is constant at least in the sealing area in the axial direction.

4. The hydraulic oil control valve according to claim 1, wherein the outer sleeve includes a non-arranged portion in which the inner sleeve is not disposed in the radial direction, the non-arranged portion has an inner diameter that is greater than that of the inner sleeve, and the axial hole passes through the outer sleeve in the axial direction.

5. The hydraulic oil control valve according to claim 1, wherein the outer sleeve includes a protrusion that protrudes radially outward and that holds a phase shifting portion of the valve timing adjustment device between the protrusion of the outer sleeve and the one shaft.

6. A valve timing adjustment device comprising the hydraulic oil control valve according to claim 1.

7. The hydraulic oil control valve according to claim 1, wherein the movement restricting portion is formed in the outer sleeve.

8. The hydraulic oil control valve according to claim 1, wherein the fitting protrusion includes a plurality of fitting protrusions arranged in a circumferential direction of the flat plate portion, the fitting portion includes a plurality of fitting portions arranged in a circumferential direction of the inner sleeve, and the plurality of fitting protrusions are fit into the plurality of fitting portions, respectively.

9. A hydraulic oil control valve for a valve timing adjustment device, the valve timing adjustment device being configured to adjust valve timing of a valve and fixed to an end portion of one shaft that is a drive shaft or a driven shaft, the driven shaft being configured to selectively open and close the valve with a driving force transmitted from the drive shaft, the hydraulic oil control valve being coaxially disposed with a rotational axis of the valve timing adjustment device and configured to control a flow of a hydraulic oil supplied from a hydraulic oil supply source, the hydraulic oil control valve comprising:

a tubular sleeve;

a spool that has an end portion in contact with an actuator and that located inward of the tubular sleeve in a radial direction and slidably moved by the actuator in an axial direction;

a movement restricting portion; and a fixing member, wherein the tubular sleeve includes:

an inner sleeve disposed radially outside of the spool; and an outer sleeve defining an axial hole extending in the axial direction, the inner sleeve being inserted into at least a portion of the axial hole in the axial direction, the movement restricting portion is configured to restrict the inner sleeve from moving away from the actuator in the axial direction, the fixing member is fixed to an end portion of the outer sleeve facing the actuator, and the fixing member is configured to restrict:

the inner sleeve from moving in a circumferential direction relative to the outer sleeve; and the inner sleeve and the spool from coming off from the outer sleeve toward the actuator in the axial direction, the fixing member is a rod-shaped pin, and the fixing member is disposed to extend through the outer sleeve and the inner sleeve.

* * * * *